United States Patent
Tobita et al.

[19]

[11] Patent Number: 5,978,350
[45] Date of Patent: Nov. 2, 1999

[54] OPTICAL DISC AND OPTICAL DISC DRIVING DEVICE

[75] Inventors: Minoru Tobita, Tokyo; Goro Fujita, Kanagawa; Satoshi Otsuka, Kanagawa; Tamotsu Yamagami, Kanagawa, all of Japan

[73] Assignee: Sony Corporation, Tokyo, Japan

[21] Appl. No.: 08/632,428

[22] PCT Filed: Aug. 24, 1995

[86] PCT No.: PCT/JP95/01682

§ 371 Date: Nov. 12, 1996

§ 102(e) Date: Nov. 12, 1996

[87] PCT Pub. No.: WO96/06433

PCT Pub. Date: Feb. 29, 1996

[30] Foreign Application Priority Data

Aug. 25, 1994 [JP] Japan ................................ P6-200877

[51] Int. Cl.⁶ ............................................. G11B 7/24
[52] U.S. Cl. ..................................... 369/275.3; 369/275.1
[58] Field of Search ............................ 369/275.3, 275.1, 369/275.6, 58, 59, 54, 32, 105, 109, 47, 111; 360/39, 40, 51

[56] References Cited

U.S. PATENT DOCUMENTS

| 4,674,081 | 6/1987 | Gerard et al. ............................ 369/275 |
| 4,819,218 | 4/1989 | Barnard ...................................... 369/50 |

(List continued on next page.)

FOREIGN PATENT DOCUMENTS

| 0201093 A1 | 12/1986 | European Pat. Off. . | |
| 0269381 A3 | 6/1988 | European Pat. Off. . | |
| 0390601 A2 | 10/1990 | European Pat. Off. ........ | G11B 7/007 |
| 0461668 A2 | 12/1991 | European Pat. Off. . | |
| 517230 | 9/1992 | European Pat. Off. . | |
| 0587019 A2 | 3/1994 | European Pat. Off. . | |
| 2635401 | 11/1988 | France ............................ | G11B 5/02 |
| 3717604 A1 | 11/1987 | Germany . | |
| 3809223 A1 | 10/1988 | Germany ........................ | G11B 20/12 |
| 58-166538 | 10/1983 | Japan ............................... | G11B 7/00 |
| 59-116911 | 7/1984 | Japan ............................... | G11B 5/09 |
| 62-220481 | 9/1988 | Japan ............................. | G11B 20/12 |
| 63-220482 | 9/1988 | Japan ............................. | G11B 20/12 |
| 2-179980 | 7/1990 | Japan ............................. | G11B 27/00 |
| 2-189742 | 7/1990 | Japan .............................. | G11B 7/24 |
| 2-189746 | 7/1990 | Japan .............................. | G11B 7/26 |
| 2-189769 | 7/1990 | Japan ............................. | G11B 20/12 |
| 2-260285 | 10/1990 | Japan ............................. | G11B 20/12 |
| 2-260286 | 10/1990 | Japan ............................. | G11B 21/08 |
| 3-130968 | 5/1991 | Japan ............................. | G11B 20/12 |
| 3-130985 | 6/1991 | Japan ............................. | G11B 11/14 |
| 4-092258 | 3/1992 | Japan ............................. | G11B 20/12 |
| 4-363575 | 12/1992 | Japan . | |
| 5-36208 | 2/1993 | Japan . | |
| 5-135507 | 6/1993 | Japan ............................. | G11B 20/12 |
| 5-144194 | 6/1993 | Japan . | |
| 5-314664 | 11/1993 | Japan . | |
| 6-28776 | 2/1994 | Japan . | |
| 6-150569 | 5/1994 | Japan . | |
| 6-195878 | 7/1994 | Japan . | |
| 6-259778 | 9/1994 | Japan ............................. | G11B 7/007 |

OTHER PUBLICATIONS

Patent Abstracts of Japan, vol. 9, No. 76, Apr. 5, 1985, JP 59–207433 (Sony K.K.), Nov. 24, 1984.
Patent Abstracts of Japan, vol. 17, No. 78, Feb. 16, 1993, JP 4–281242 (Matsushita Electric), Oct. 6, 1992.
Patent Abstracts of Japan, vol. 17, No. 536, Sep. 27, 1993, JP 5–144184 (Sony Corp.), Jun. 11, 1993.

*Primary Examiner*—Ali Neyzari
*Attorney, Agent, or Firm*—Limbach & Limbach L.L.P.

[57] ABSTRACT

An optical disk having a plurality of substantially concentric tracks, each of which includes a plurality of segments each comprising a servo area ARs provided with servo pits for giving servo information to a disk drive and a data area ARd. Identification marks SGM, ADM, STM1, STM2 are recorded in the servo area ARs. The identification marks SGM, ADM, STM1, STM2 provide information for identifying the respective segments depending on the recording position in the servo area ARs.

24 Claims, 30 Drawing Sheets

U.S. PATENT DOCUMENTS

| | | | |
|---|---|---|---|
| 4,858,221 | 8/1989 | Romeas | 369/275 |
| 4,896,311 | 1/1990 | Ishihara | 369/47 |
| 4,918,677 | 4/1990 | Ashinuma et al. | 369/32 |
| 4,991,163 | 2/1991 | Tokushuku et al. | 369/275.4 |
| 5,036,408 | 7/1991 | Leis et al. | 360/48 |
| 5,107,473 | 4/1992 | Fuji et al. | 369/32 |
| 5,124,967 | 6/1992 | Isaka et al. | 369/48 |
| 5,170,385 | 12/1992 | Senshu et al. | 369/48 |
| 5,172,357 | 12/1992 | Taguchi | 369/48 |
| 5,179,547 | 1/1993 | Komaki et al. | 369/275.4 |
| 5,193,034 | 3/1993 | Tsuyoshi et al. | 360/51 |
| 5,199,023 | 3/1993 | Yamamoto et al. | 369/275.4 |
| 5,206,847 | 4/1993 | Kanda | 369/44.13 |
| 5,214,629 | 5/1993 | Watanabe et al. | 369/44.26 |
| 5,233,590 | 8/1993 | Ogawa | 369/48 |
| 5,237,554 | 8/1993 | Senshu et al. | 369/59 |
| 5,239,530 | 8/1993 | Seo et al. | 369/54 |
| 5,255,261 | 10/1993 | Iida et al. | 369/275.3 |
| 5,255,263 | 10/1993 | Van Uijen et al. | 369/275.3 |
| 5,278,814 | 1/1994 | Deguchi et al. | 369/47 |
| 5,283,776 | 2/1994 | Takagi | 369/58 |
| 5,295,127 | 3/1994 | Verboom et al. | 369/58 |
| 5,295,130 | 3/1994 | Tobita et al. | 369/124 |
| 5,343,453 | 8/1994 | Ogino | 369/44.28 |
| 5,363,352 | 11/1994 | Tobita et al. | 369/13 |
| 5,388,090 | 2/1995 | Hoshino et al. | 369/275.3 |
| 5,400,309 | 3/1995 | Satomura | 369/32 |
| 5,416,766 | 5/1995 | Horimai | 369/116 |
| 5,418,768 | 5/1995 | Susumu | 369/59 |
| 5,436,770 | 7/1995 | Muto et al. | 360/51 |
| 5,440,474 | 8/1995 | Hetzler | 360/135 |
| 5,469,415 | 11/1995 | Fujita et al. | 369/48 |
| 5,469,420 | 11/1995 | Fujita et al. | 369/59 |
| 5,488,593 | 1/1996 | Furumiya et al. | 369/32 |
| 5,497,367 | 3/1996 | Yamagami et al. | 369/275.2 |
| 5,506,827 | 4/1996 | Tobita | 369/59 |
| 5,524,103 | 6/1996 | Shimizu et al. | 369/59 |
| 5,602,690 | 2/1997 | Tomisaki et al. | 360/75 |
| 5,684,783 | 11/1997 | Horimai et al. | 369/124 |

FIG. 9

| i\j | 0 | 1 | ... | 7 | 8 | 9 | 10 | 11 | 12 | 13 | 14 | 15 |
|---|---|---|---|---|---|---|---|---|---|---|---|---|
| 130 | D0 | D1 | | D7 | D8 | D9 | D10 | D11 | D12 | D13 | D14 | D15 |
| 129 | D16 | D17 | | D23 | D24 | D25 | D26 | D27 | D28 | D29 | D30 | D31 |
| 128 | D32 | D33 | | D39 | D40 | D41 | D42 | D43 | D44 | D45 | D46 | D47 |
| 127 | D48 | D49 | | D55 | D56 | D57 | D58 | D59 | D60 | D61 | D62 | D63 |
| 126 | D64 | D65 | | D71 | D72 | D73 | D74 | D75 | D76 | D77 | D78 | D79 |
| 125 | D80 | D81 | | D87 | D88 | D89 | D90 | D91 | D92 | D93 | D94 | D95 |
| 124 | D96 | D97 | | D103 | D104 | D105 | D106 | D107 | D108 | D109 | D110 | D111 |
| 123 | D112 | D113 | | D119 | D120 | D121 | D122 | D123 | D124 | D125 | D126 | D127 |
| ... | | | | | | | | | | | | |
| 4 | D2016 | D2017 | | D2023 | D2024 | D2025 | D2026 | D2027 | D2028 | D2029 | D2030 | D2031 |
| 3 | D2032 | D2033 | | D2039 | D2040 | D2041 | D2042 | D2043 | D2044 | D2045 | D2046 | D2047 |
| 2 | U.D. | U.D. | | U.D. | U.D. | U.D. | U.D. | U.D. | U.D. | U.D. | U.D. | U.D. |
| 1 | U.D. | U.D. | | U.D. | U.D. | U.D. | U.D. | U.D. | U.D. | U.D. | U.D. | U.D. |
| 0 | U.D. | U.D. | | U.D. | CRC1 | CRC2 | CRC3 | CRC4 | CRC5 | CRC6 | CRC7 | CRC8 |
| -1 | E1,1 | E2,1 | | E8,1 | E9,1 | E10,1 | E11,1 | E12,1 | E13,1 | E14,1 | E15,1 | E16,1 |
| -2 | E1,2 | E2,2 | | E8,2 | E9,2 | E10,2 | E11,2 | E12,2 | E13,2 | E14,2 | E15,2 | E16,2 |
| -3 | E1,3 | E2,3 | | E8,3 | E9,3 | E10,3 | E11,3 | E12,3 | E13,3 | E14,3 | E15,3 | E16,3 |
| -4 | E1,4 | E2,4 | | E8,4 | E9,4 | E10,4 | E11,4 | E12,4 | E13,4 | E14,4 | E15,4 | E16,4 |
| ... | | | | | | | | | | | | |
| -13 | E1,13 | E2,13 | | E8,13 | E9,13 | E10,13 | E11,13 | E12,13 | E13,13 | E14,13 | E15,13 | E16,13 |
| -14 | E1,14 | E2,14 | | E8,14 | E9,14 | E10,14 | E11,14 | E12,14 | E13,14 | E14,14 | E15,14 | E16,14 |
| -15 | E1,15 | E2,15 | | E8,15 | E9,15 | E10,15 | E11,15 | E12,15 | E13,15 | E14,15 | E15,15 | E16,15 |
| -16 | E1,16 | E2,16 | | E8,16 | E9,16 | E10,16 | E11,16 | E12,16 | E13,16 | E14,16 | E15,16 | E16,16 |

WRITE DIRECTION →

TOTAL 145×16=2352 BYTES

145 CODE WORD

| ZONE | OUTER RADIUS(μm) | TRACKS | CLOCK | SECTOR | BYTE/SEG | SEG/SECTOR | MIN DENSITY | CAP (MB) |
|---|---|---|---|---|---|---|---|---|
| GCP | 42100 | 736 | 24 | 40 | | | | 0.078 |
| BUFFER TRACKS | 41216.8 | 2 | 48 | 100 | | | | 0.195 |
| CONTROL TRACKS | 41214.4 | 5 | 48 | 40 | | | | 0.078 |
| BUFFER TRACKS | 41208.4 | 2 | 48 | 100 | | | | 0.195 |
| TEST TRACKS | 41206 | 5 | 48 | | | | | |
| USER ZONE 0 | 41200 | 848 | 48 | 20800 | 46 | 65 | 0.42817 | 40.625 |
| USER ZONE 1 | 40182.4 | 864 | 47 | 20800 | 46 | 65 | 0.42811 | 40.625 |
| USER ZONE 2 | 39145.6 | 880 | 46 | 20800 | 46 | 65 | 0.42808 | 40.625 |
| USER ZONE 3 | 38089.6 | 912 | 45 | 20800 | 46 | 65 | 0.42802 | 40.625 |
| USER ZONE 4 | 36995.2 | 944 | 43 | 20800 | 46 | 53 | 0.41745 | 40.625 |
| USER ZONE 5 | 35862.4 | 976 | 42 | 20800 | 45 | 54 | 0.41533 | 40.625 |
| USER ZONE 6 | 34691.2 | 1024 | 40 | 20800 | 44 | 55 | 0.41291 | 40.625 |
| USER ZONE 7 | 33462.4 | 1056 | 39 | 20800 | 43 | 57 | 0.40996 | 40.625 |
| USER ZONE 8 | 32195.2 | 1120 | 37 | 20800 | 41 | 59 | 0.41589 | 40.625 |
| USER ZONE 9 | 30851.2 | 1184 | 35 | 20800 | 40 | 61 | 0.41189 | 40.625 |
| USER ZONE 10 | 29430.4 | 1216 | 34 | 20800 | 38 | 64 | 0.41716 | 40.625 |
| USER ZONE 11 | 27971.2 | 1296 | 32 | 20800 | 37 | 66 | 0.41166 | 40.625 |
| USER ZONE 12 | 26416 | 1392 | 30 | 20800 | 35 | 70 | 0.4158 | 40.625 |
| USER ZONE 13 | 24745.6 | 1488 | 28 | 20800 | 33 | 74 | 0.41931 | 40.625 |
| USER ZONE 14 | 22960 | 1696 | 25 | 20800 | 32 | 76 | 0.41024 | 40.625 |
| USER ZONE 15 | 20924.8 | 770 | 24 | 9100 | 30 | 81 | 0.41165 | 17.773 |
| TEST TRACKS | 20000.8 | 5 | 24 | 50 | 28 | 87 | 0.41133 | 0.098 |
| BUFFER TRACKS | 19994.8 | 2 | 24 | 20 | 26 | 93 | 0.40891 | 0.039 |
| CONTROL TRACKS | 19992.4 | 5 | 24 | 50 | 23 | 106 | 0.41738 | 0.098 |
| BUFFER TRACKS | 19986.4 | 2 | 24 | 20 | 22 | 110 | 0.41557 | 0.039 |
| | 19984 | | | | 22 | 130 | 0.41545 | |
| GCP | 19000 | 820 | 24 | | 22 | 130 | 0.4154 | |
| | | | | | 22 | 130 | 0.41527 | |
| | | | | | 22 | 130 | 0.41522 | |

FIG.11

SCRAMBLE TABLE

| | | | | | | | | | | | | | | | |
|---|---|---|---|---|---|---|---|---|---|---|---|---|---|---|---|
| 80 | 6a | 46 | b4 | 9c | 90 | 92 | ed | 78 | c1 | 8a | e9 | 86 | eb | f9 | 7e |
| 40 | 35 | 23 | 5a | 4e | 48 | c9 | 76 | bc | 60 | c5 | 74 | c3 | f5 | 7c | 3f |
| a0 | 9a | 11 | 2d | 27 | a4 | 64 | 3b | 5e | b0 | 62 | ba | e1 | 7a | be | 1f |
| 50 | cd | 88 | 96 | 13 | 52 | b2 | 1d | 2f | 58 | 31 | dd | 70 | 3d | df | 0f |
| a8 | 66 | 44 | cd | 09 | 29 | d9 | 8e | 17 | ac | 98 | 6e | b8 | 9e | ef | 07 |
| 54 | 33 | a2 | e5 | 84 | 94 | 6c | c7 | 0b | 56 | 4c | 37 | 5c | cf | f7 | 03 |
| aa | 19 | d1 | 72 | 42 | 4a | b6 | e3 | 05 | 2b | a6 | 1b | ae | e7 | fb | 01 |
| d5 | 8c | 68 | 39 | 21 | 25 | db | f1 | 82 | 15 | d3 | 0d | d7 | f3 | fd | |

OPTICAL DISC AND OPTICAL DISC DRIVING DEVICE

TECHNICAL FIELD

This invention relates to an optical disc of the sample servo system and a driving device therefor.

BACKGROUND ART

There has hitherto been known an optical disc system for recording/reproducing various data by scanning a concentrically or spirally extending track on the disc by a laser beam, in which the optical disc is driven at a constant linear velocity (CLV) or at a constant angular velocity (CAV) for recording/reproducing the data. There has also been known an optical disc system of a continuous servo system in which tracking control is performed using a continuous pre-groove formed along the track, or of a sample servo system in which tracking control is performed using discrete servo areas formed on the track.

Among known types of the optical discs, there are a recordable RAM disc, such as a replay-only ROM disc, a write-once disc or a magneto-optical disc (MO disc) and a so-called partial ROM disc having both ROM and RAM areas.

An optical disc system, handling such optical disc, is configured for reading the parameter information for the medium recorded on a phase encoded part (PEP) provided on an inner rim of the optical disc as prescribed in ISO MO 5.25 inch standards and for reading the control information from the control track based upon the control information for carrying out the control operation responsive to the control information.

With the continuous composite servo system (CCS system) standardized in ISO, servo data is affected by data per se. That is, if data recording density is increased, system clocks can be reproduced with increasing difficulties, such that it becomes difficult to achieve high recording density. Besides, since the groove and pits must be cut simultaneously, it is difficult to produce a ROM disc or a partial ROM disc.

In addition, with the conventional optical disc, a dedicated decoding circuit has been required for reading out the parameter information recorded on the PEP. Since the PEP lacks in the address information, the pickup position cannot be identified. Since the PEP and the recording area for data per se are different in formats, the two areas need to be demarcated from each other via a gap.

It is therefore an object of the present invention to provide an optical disc of a sample servo system of high capacity and high performance, and a driving system therefor.

It is another object of the present invention to provide an optical disc in which the parameter information can be read without requiring a dedicated decoding circuit and in which the pickup position can be identified.

DISCLOSURE OF THE INVENTION

The present invention provides an optical disc having a plurality of substantially concentrically extending tracks, each track including a plurality of segments having a servo area having servo pits giving the servo information to a disc drive and a data area. There is provided a discrimination mark giving the information for identifying a segment by the recording position in the servo area.

With the optical disc of the present invention, the segments include a data segment for recording user data and an address segment for specifying an address of the data segment. The discrimination mark discriminates the data segment from the address segment.

With the optical disc of the present invention, a sector is formed by a plurality of segments and a segment at a leading end of the sector is identified by the discrimination mark.

With the optical disc of the present invention, a sector is formed by a plurality of segments and a segment at a leading end of the sector and a directly previous segment are identified by the discrimination mark.

With the optical disc of the present invention, the segments include a data segment for recording user data and an address segment specifying an address of the data segment, and a plurality of said segments make up a sector. The data segment and the address segment may be discriminated from each other by the discrimination mark and the segment constituting the leading end of the sector and the directly previous segment may be discriminated from each other by the discrimination mark.

With the optical disc of the present invention, a segment directly previous to the segment at the leading end of the sector is identified by said discrimination mark.

The present invention also provides an optical disc having a plurality of substantially concentrically extending tracks, each track including a plurality of segments having a servo area having servo pits giving the servo information to a disc drive area, and a data area, in which the segments are made up of address segments arranged at the same positions in the radial direction of the tracks and having the address information recorded in said data area, and a data segment for recording user data, and in which the address information is recorded in the address segment in the gray code representation using a region of five clocks for the 2-bit information. The clocks are generated by a disc drive based upon the servo pits.

The present invention also provides an optical disc having a plurality of substantially concentrically extending tracks, each track including a plurality of segments having a servo area having servo pits giving the servo information to a disc drive, and a data area, in which plural segments are made up of address segments formed at the same position in the radial direction of each track and having the address information recorded in each data area and a data segment for recording user data. The address information is recorded as bits in 4-bit gray code representation in a 11-clock area of the clock signals in said address segment, upper two bits in the four bits corresponding to 5 clocks by the gray code representation and the lower two bits corresponding to 5 clocks in the gray code representation, and one clock therebetween. The 1-clock area has a pit formed therein when the pit representing the upper two bits in the gray code representation and the pit representing the lower two pits in the gray code representation are at the shortest distance from the one-clock area and when one of the pits is at the shortest distance and the outer is at the longest distance from the one-clock area.

With the optical disc of the present invention, plural servo pits are recorded in the servo area so as to have an area of two clock signals and a distance of not less than 5 pits.

With the optical disc of the present invention, scrambled and NRZI converted data is recorded in said data segment.

With the optical disc of the present invention, a pre-write area having data of a pre-set polarity recorded therein is provided at a leading end of a data area of the data segment.

With the optical disc of the present invention, a post-write area having data of a pre-set polarity recorded therein is provided at a trailing end of a data area of the data segment.

The present invention also provides an optical disc having a plurality of substantially concentrically extending tracks, each track including a plurality of segments arranged in the same radial direction relative to the track and having a servo area having servo pits giving the servo information to a disc drive, and a data area, in which the optical disc is divided into plural zones each having a uniform number of sectors by setting the relation of the number of servo clocks SCKseg per segment and the number of data clocks DCKseg per segment, wherein M and N are integers.

With the optical disc of the present invention, the number of servo clocks SCKseg per segment is set to SCKseg=9N.

With the optical disc of the present invention, the next zone is started from the next segment even if there is a redundant area in the last segment of a zone and the start segments of the respective zones are arrayed at the same radial positions.

The present invention also provides an optical disc having a plurality of substantially concentrically extending tracks, each track including a plurality of segments having a servo area having servo pits giving the servo information to a disc drive, and a data area, in which the segments include address segments arranged in the same radial direction of the track and adapted for recording the address information in the gray code representation in the data area, and a data segment for recording user data, and in which a media information area in which the media information coded in the same gray code representation as the address information is recorded in a data area of a portion of the plural tracks.

With the optical disc of the present invention, the media information area is formed across plural consecutive tracks.

With the optical disc of the present invention, the media information of the same contents is recorded in data areas of the same angular position of the consecutive plural tracks.

With the optical disc of the present invention, the media information area is provided in each of inner rim and outer rim regions.

With the optical disc of the present invention, the media information is recorded in each data area of a portion of said tracks.

With the optical disc of the present invention, the address information is recorded in said address segment as gray code using an area corresponding to five clocks generated by a disc drive based on the servo pits for the information of two bits.

With the optical disc of the present invention, address information is recorded as bits in 4-bit gray code representation in a 11-clock area of said clock signals in said address segment, upper two bits in the four bits corresponding to 5 clocks by gray code representation and the lower two bits corresponding to 5 clocks in gray code representation, and one clock therebetween. The 1-clock area has a pit formed therein when the pit representing the upper two bits in gray code representation and the pit representing the lower two pits in the gray code representation are at the shortest distance from the one-clock area and when one of the pits is at the shortest distance and the outer is at the longest distance from the one-clock area.

With the optical disc of the present invention, media information indicates a once-write type or a replay-only type.

With the optical disc of the present invention, the media information for the same contents is recorded in plural data areas of said portion of the tracks.

The present invention also provides an optical disc having a plurality of substantially concentrically extending tracks, each track including a plurality of segments having a servo area having servo pits giving the servo information to a disc drive, and a data area, in which the segments are made up of address segments arranged at the same positions in the radial direction of the tracks and having the address information recorded in the data area, and a data segment for recording user data, and in which a media information area having recorded therein the media information in the gray code representation is formed in a plurality of tracks in the vicinity of the inner rim and in a plurality of tracks in the vicinity of the outer rim.

The present invention also provides an optical disc driving device for driving an optical disc in which the optical disc has formed thereon a plurality of substantially concentrically extending tracks, each track having a plurality of segments each having a servo area having servo pits giving the servo information to the disc drive and a data area, a discrimination mark being provided in the servo area for representing the information for discriminating the segment by the recording position in the servo area. The optical disc driving device includes reproducing means for reproducing the information recorded on the optical disc, detection means for detecting the position of the discrimination mark by playback signals reproduced by the reproducing means from the discrimination mark by a differential detection method, and discrimination means for discriminating the segment based upon the results of detection by the detection means.

The present invention also provides an optical disc driving device for driving an optical disc in which the optical disc has formed thereon a plurality of substantially concentrically extending tracks, each track having a plurality of segments each having a servo area having servo pits giving the servo information to the disc drive and a data area, and a pre-write area unified to a polarity at the distal end of the data area. The optical disc driving device includes recording/reproducing means for reproducing data from the optical disc and for recording data on the optical disc, driving power producing means for producing a low-level playback driving power or a high-level recording driving power to the recording/reproducing means, data supplying means for supplying recording data to the recording/reproducing means, and control means for controlling the driving power producing means so that the driving power is switched from the playback driving power to the recording driving power during recording at a timing the optical pickup of the recording/reproducing means is moved from the servo area to the pre-write area of the data area. The control means controls said data supply means for supplying data of the same polarity as the one polarity to the optical pickup. The control means controls the data supplying means for supplying desired data to the optical pickup at a timing the pickup traverses the pre-write area.

With the optical disc of the present invention, clamping means for clamping the data reproduced by the recording/reproducing means at a timing of the pre-write area during reproduction.

BRIEF DESCRIPTION OF THE DRAWINGS

FIG. 2A shows clocks in a servo area and aa data area, FIG. 2B shows a servo area having a segment mark SDG, FIG. 2C shows a servo area having an address mark ADM, FIG. 2D shows a servo area having a first sector mark STM1 and FIG. 2E shows a servo area having a second sector mark STM2.

FIG. 9 shows the data format of a data sector of the optical disc.

FIG. 11 shows a setting parameter of area division in the optical disc.

BEST MODE FOR CARRYING OUT THE INVENTION

Figure 1:
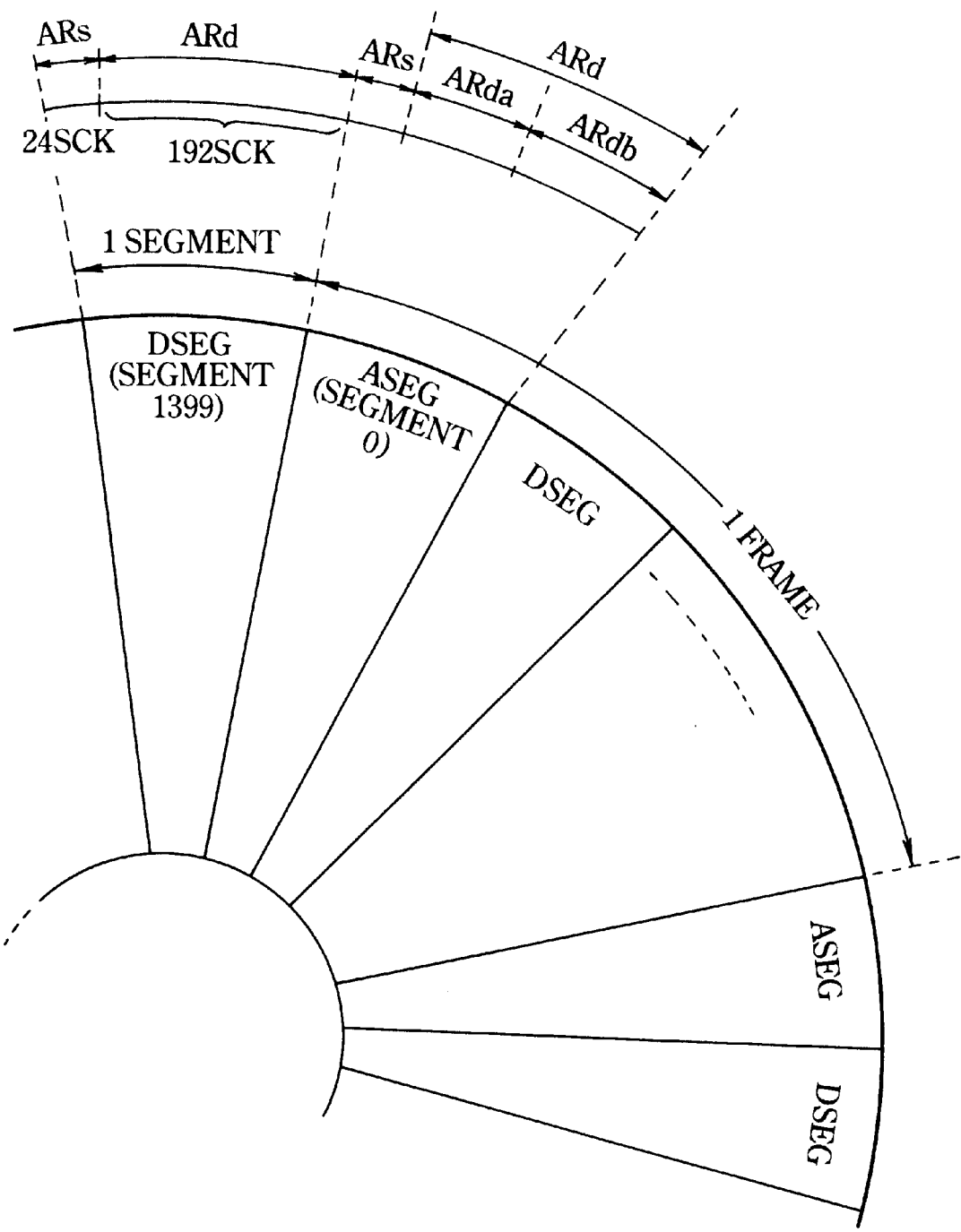
FIG. 1 illustrates a segment structure of an optical disc according to the present invention.

Referring to the drawings, preferred embodiments of the present invention will be explained in detail.

First, the format of the optical disc according to the present invention is explained. The optical disc of the present invention is a zone CAV-sample servo system optical disc. Meanwhile, the present invention is explained with reference to a replay-only ROM disc and a recordable MO disc. Unless specifically defined, the following description is directed to common contents of the two discs.

The optical disc according to the present invention has its full turn of a track divided into 1,400 segments (segment 0 to segment 1399) as shown in FIG. 1. These segments are classified into address segments ASEG and data segments DSEG.

Figure 8:
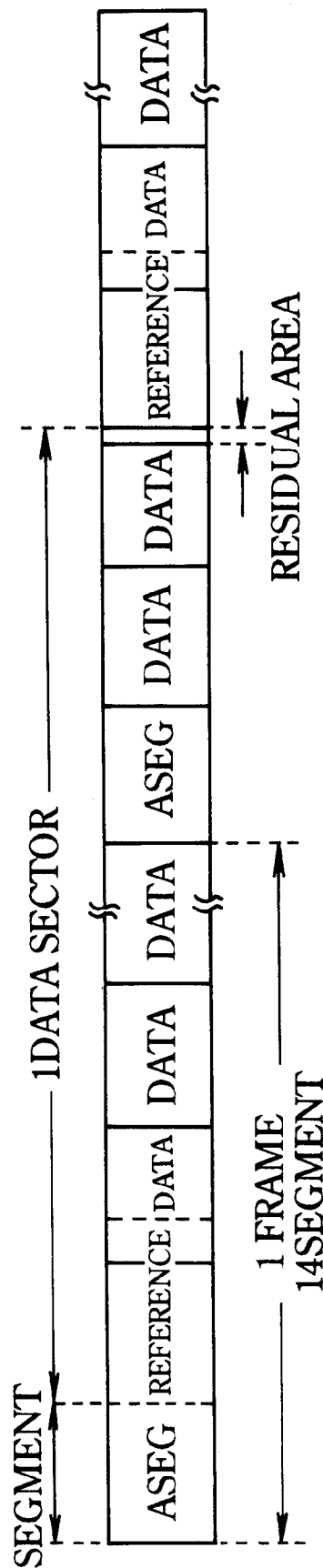
FIG. 8 shows the constitution of an I-frame and an I-data sector of the optical disc.

In each track of the address segment ASEG, the position information along the radius of the disc, that is track numbers, and the position in the tangential direction of the track, that is the segment numbers, are pre-recorded by pits. During fabrication of the optical disc, pits are formed based upon this position information. The address segments ASEG are present every 14 segments, such that there are 100 address segments in each track. An area from a given address segment ASEG to the next address segment ASEG is one frame, such that there are 100 frames in one track, as shown in FIG. 8. The 13 segments between two neighboring address segments ASEG are segments DSEG. There are 1300 data segments DSEG in one track. Each segment is comprised of an area corresponding to 216 servo clocks, namely 24 servo clocks and 192 servo clocks constituting a servo area ARs and a data area ARd, respectively. With the address segment ASEG, the data area ARd is constituted by an address area ARda and a laser control area ARdb.

Referring to FIGS. 2A to 2D, the format of a MO disc is explained. In the servo area ARs, three pits Pa, Pb and Pc, each 2 servo clocks long, are pre-recorded with a center-to-center spacing from each other corresponding to five servo clocks, as shown in FIGS. 2A to 2E. There is also provided a focusing sample area ARfs having a length corresponding to six clocks in the servo area ARs.

By setting the bits Pa, Pb and Pc of the servo area ARs so as to be two servo clocks long, the portions free of pits, namely mirror portions, are diminished, thus rendering it difficult to generate ghost bits during disc molding. Since RF signals can be stably reproduced from the pits Pa, Pb and Pc during accessing, various servo signals, such as tracking servo signals, can be stably produced based upon RF signals reproduced from the pits Pa, Pb and Pc. In addition, by separating the center-to-center distance between the pits Pa, Pb and Pc by more than a pre-set distance, data interference between RF signals reproduced from the pits Pa, Pb and Pc may be reduced significantly. For reducing the data interference between pits, it is desirable to separate the pits Pa, Pb and Pc by not less than five servo clocks.

The second pits Pb disposed between the 11th and 12th clocks and the third pits Pc disposed between the 16th and 17th clocks are wobbling pits, offset from the track centers by ±¼ track along the disc radius, and give the tracking error information by the difference in amplitude values of RF signals reproduced by these pits Pb and Pc. Also, as explained subsequently by referring to FIG. 29, the difference in amplitude values at both shoulder portions of RF signals reproduced from these pits Pb and Pc gives the phase information of servo clocks, while the sum of the phase information gives the clock phase information which is independent of the tracking state.

Figure 2:
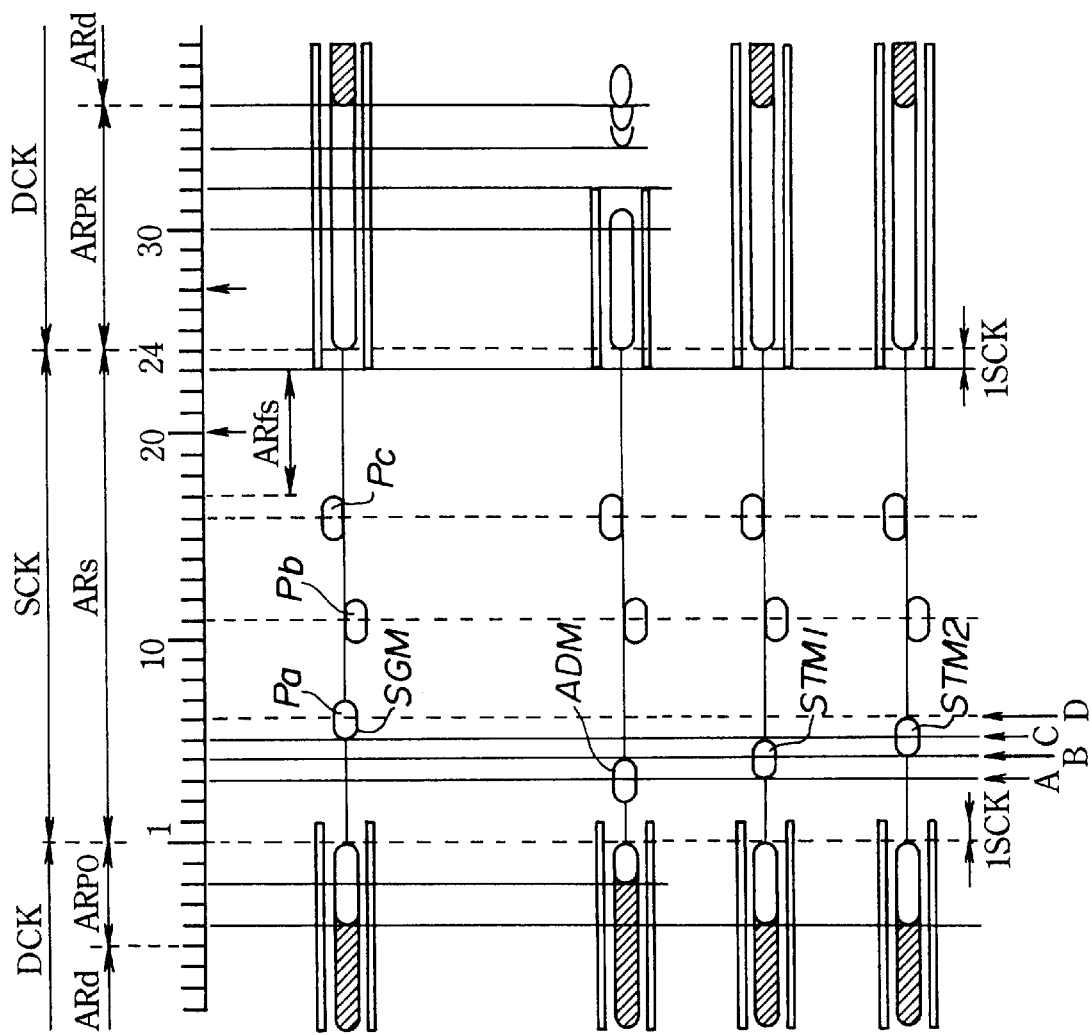
FIGS. 2A to 2E illustrate a format of mainly a servo area when the optical disc is a MO disc.

The first pits Pa at the leading end of the servo area ARs are classified by their positions into an address mark ADM indicating that the segment is an address segment ASEG, a first sector mark STM1 indicating that the segment is a leading segment of the sector, a second sector mark STM2 indicating that the next segment is a segment at the leading end of the sector and a segment mark SGM not belonging to any of the above sector marks. The first pit Pa becomes the address mark ADM, first sector mark STM1 and the second sector mark STM2 if it is disposed at the third to fourth clock period, as shown in FIG. 2C, at the fourth to fifth clock period, as shown in FIG. 2D and at the fifth to sixth clock period, as shown in FIG. 2E, respectively. The start position for each sector is explained subsequently by referring to FIG. 13. The information indicated by the first pit Pa may be discerned by checking the position of the maximum amplitude value of the reproduced RF signal by detecting the maximum value of the difference, that is by the so-called differential detection method, as shown for example in FIG. 3.

Since the first pit Pa at the leading end of the servo area ARs gives the information specifying the address mark ADM, first sector mark STM1 and the second sector mark STM2, it is unnecessary to record the sector number or the track address on the sector basis.

Figure 4:
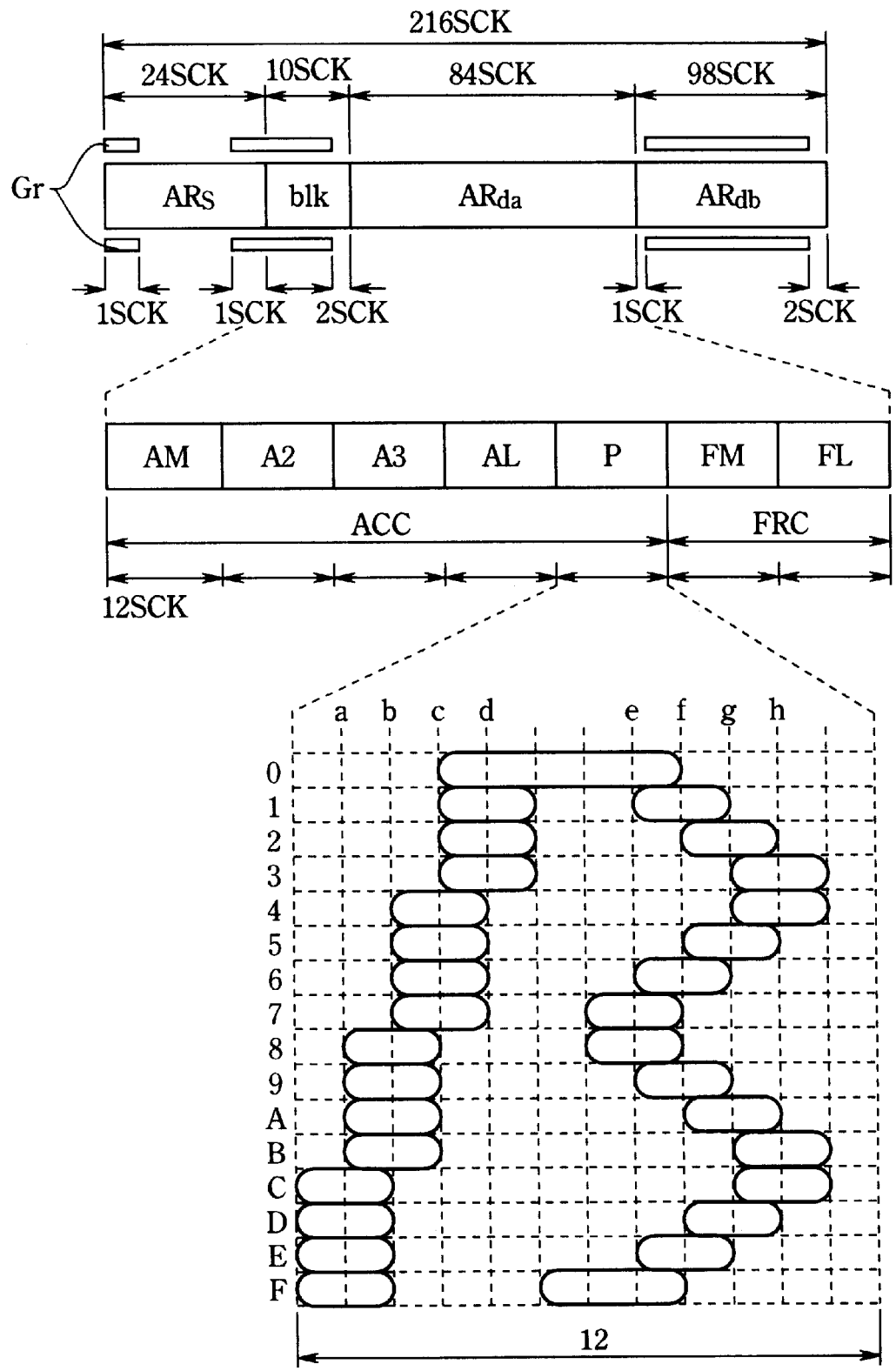
FIG. 4 shows a format of an address segment in the above optical disc.

In the address segment ASEG, an access code ACC composed of 16-bit track addresses [AM], [A2], [A3] and [AL] and the parity [P], and a frame code FRC, composed of frame addresses [FM] and [FL], are pre-recorded as pits in the gray code as the position information along the radius of the disc and as the position information along the tangential direction of the disc, respectively, as shown in FIG. 4. The 16 bits of the track address of the access code ACC are divided into groups each made up of four bits, and converted by table conversion based upon a gray code table shown in FIG. 4 in the sequence of AM=15 to 12 bits (MSN), A2=11 to 8 bits (2SM), A3=7 to 4 bits (3SM) and AL=3 to 0 bits (LSN). If and only if the lowermost one of the four bits is [1], each of the next following four bits is its 1's complement. Thus these access codes are changed only by one pattern between neighboring tracks. The access codes are classified by the bit positions of the access codes into groups [15, 11, 7, 3], [14, 10, 6, 2], [13, 9, 5, 1] and [12, 8, 4, 0] and a parity which becomes 1 when the number of bits [1] in each group [15, 11, 7, 3], [14, 10, 6, 2], [13, 9, 5, 1] and [12, 8, 4, 0] is even is recorded.

Thus, by using a 1' complement for each of next 4 bits only if the lower most bit of previous four bits is [1] so that these access codes are changed by only one pattern between neighboring tracks, the center one clock region bit is formed for [0] in which a pit indicating the gray code of the upper two bits and a pit indicating the gray code of the lower two pits are at the shortest distance, and for [F] in which one is at the shortest a distance and the other is at the longest distance, so that the center one-clock area does not become a continuous mirror area in the radial direction and hence the resin flow may be uniformed during disc molding to render it possible to mold a disc of high quality.

Figure 5:
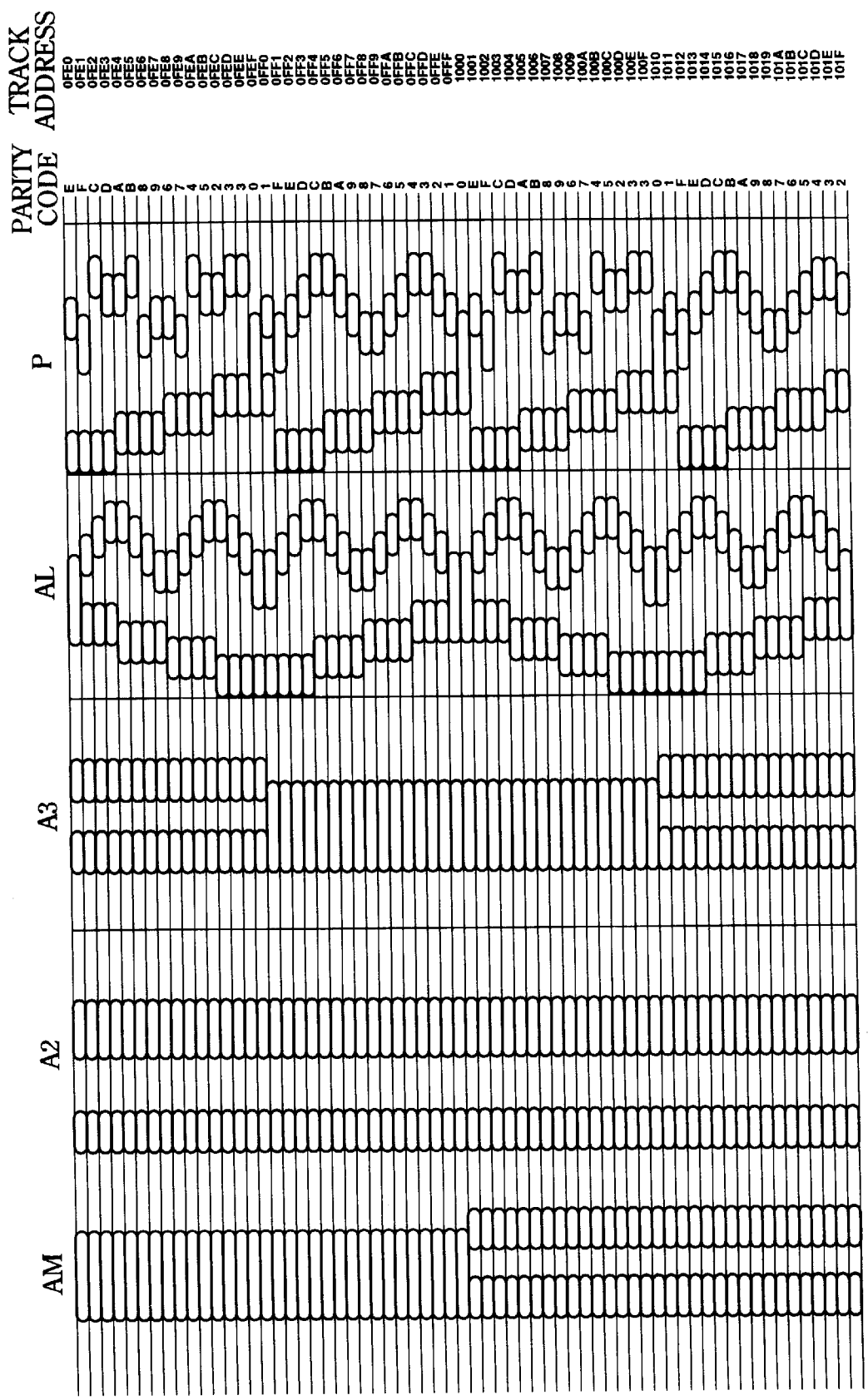
FIG. 5 shows a portion of an access code recorded in the address segment shown in FIG. 4.

FIG. 5 shows a portion of the access code ACC.

As for the frame code FRC, the information in the tangential direction of the address segment ASEG, that is the 8-bit frame address specifying the frame number, is divided into upper four bits and lower four bits, with the upper four bits FM=7 to 4 bits (MSN) and the lower four bits LM=3 to 0 bits (MSN), are recorded in the from of gray code in the same way as for the access codes explained above. Although the 8-bit information can be recorded as the frame codes, there are only the values of 0 to 99 of the number of the address segments ASEG.

Meanwhile, a focus sample area ARfs of the servo area ARs is the mirror portion and is used in the optical disc driving device for focusing servo, read power APC (automatic power control) or RF signal clamping. The positions of various sample pulses for theses operations are difficult to identify correctly, such that variations not larger than +5 servo clock pitches may be estimated. Thus the mirror portion has an area of 6 clocks as a space for sampling with a correct value without being affected by level modulation of RF signal level by pits despite these variations.

Figure 6:
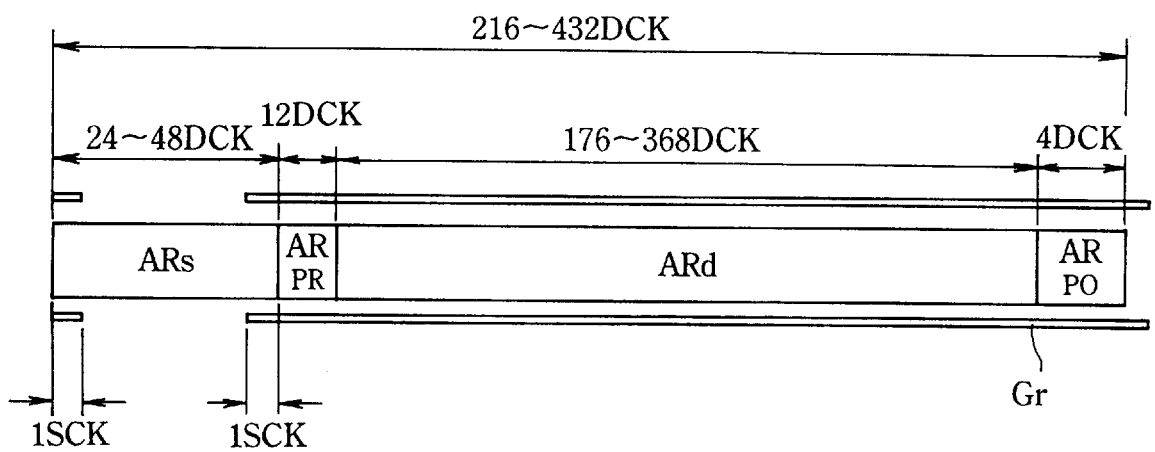
FIG. 6 shows a format of a data segment in the optical disc.

On the other hand, the data area ARd of the data segment DSEG is made up of the data area ARd of 176 to 368 data clocks for recording user data, a pre-write area $AR_{PR}$ of 12 data clocks and a post-write area $AR_{PO}$ of four data clocks, as shown in FIG. 6. The number of data clocks is changed with zones. The pre-write area $AR_{PR}$ is provided as a clamp area for securing a distance necessary for pre-heating since start of laser illumination by the driving device until the disc reaches a stable temperature for recording in case the disc is a MG disc and for suppressing variations in DC due to double refraction of MO signals. For assuring format interchangeability, the ROM disc is also provided with the pre-write area $AR_{PR}$. The post-write area $AR_{PO}$ is provided for assuring a distance for eliminating insufficient erasure of recorded data and for avoiding interference of data otherwise caused by the edge of the groove Gr provided on the MO disc. The MO disc is unidirectionally bulk-erased at the time of shipment. By recording data of the same magnetic properties as those in the bulk erasure direction on the pre-write area $ART_{PR}$, recorded data remains unchanged even if data cannot be correctly recorded on the pre-write area $AR_{PO}$ due to insufficient residual heat of the recording medium, so that stable signal may be reproduced. In addition, it is effective to provide a data string stabilized at a constant value for decoding from rear data in viterbi decoding by recording the same data of four data clocks in the post-write area $AR_{PO}$.

FIG. 6 shows the case of a MO disc. In the case of the ROM disc, the groove Gr in FIG. 6 is deleted.

Since stable signals may be produced when clamping is performed during reproduction using the pre-write area $AP_{PR}$, an accurate clamping operation may be performed.

Figure 7:
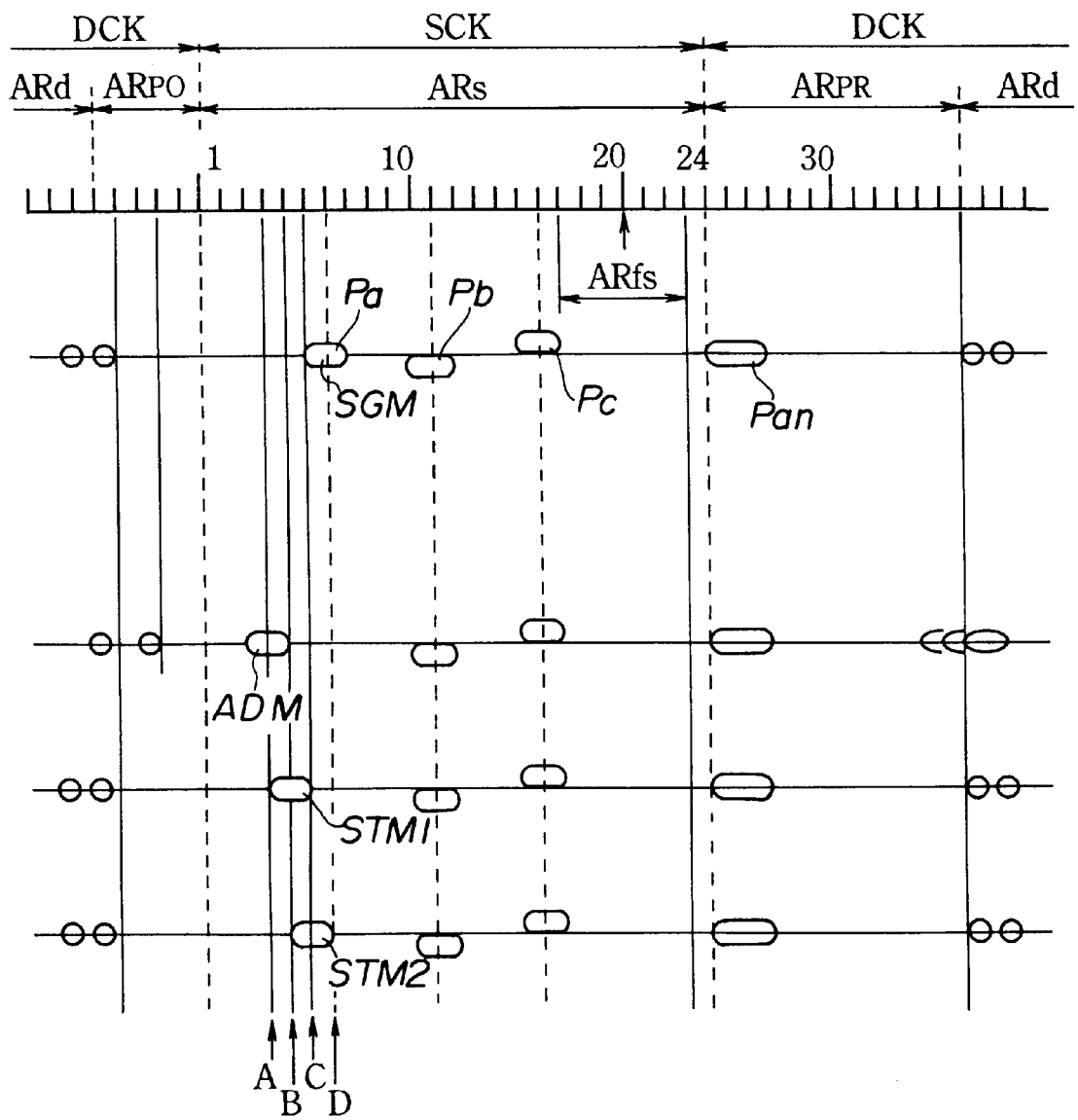
FIG. 7 shows a format of mainly a servo area in a ROM disc.

It is noted that, since no pits are pre-formed in an area for data re-writing, the mirror area width is larger than with the replay-only optical disc in which both data and pits are pre-recorded as pits. Therefore, by providing a groove Gr in an area corresponding to the data area ARd, as shown in FIG. 6, it becomes possible to diminish the mirror portion to alleviate ill effects of disc molding on servo pits. Since the groove Gr is not employed for tracking control, it is not required to be particularly precise. In the present embodiment, the groove has a depth of $\lambda/8$, where $\lambda$ is the laser wavelength. With the replay-only ROM disc, the anchor pit Pan having a region of 3 data clocks is provided at a leading portion of the data area ARd, as shown in FIG. 7, the mirror portion may be diminished to alleviate ill effects of disc molding on servo pits.

Each data sector is made up of 66 bytes of reference data, 2048 bytes of user data (D0 to D2047), 256 bytes of ECC (E1,1 to E16, 16), 8 bytes of CRC (CRC 1 to CRC 8) and 40 bytes of user defined data (UD), totalling at 2418 bytes, as shown in FIGS. 8 and 9. The data format for 2352 bytes, excluding 66 bytes of the reference data, is shown in FIG. 9.

Figure 10:
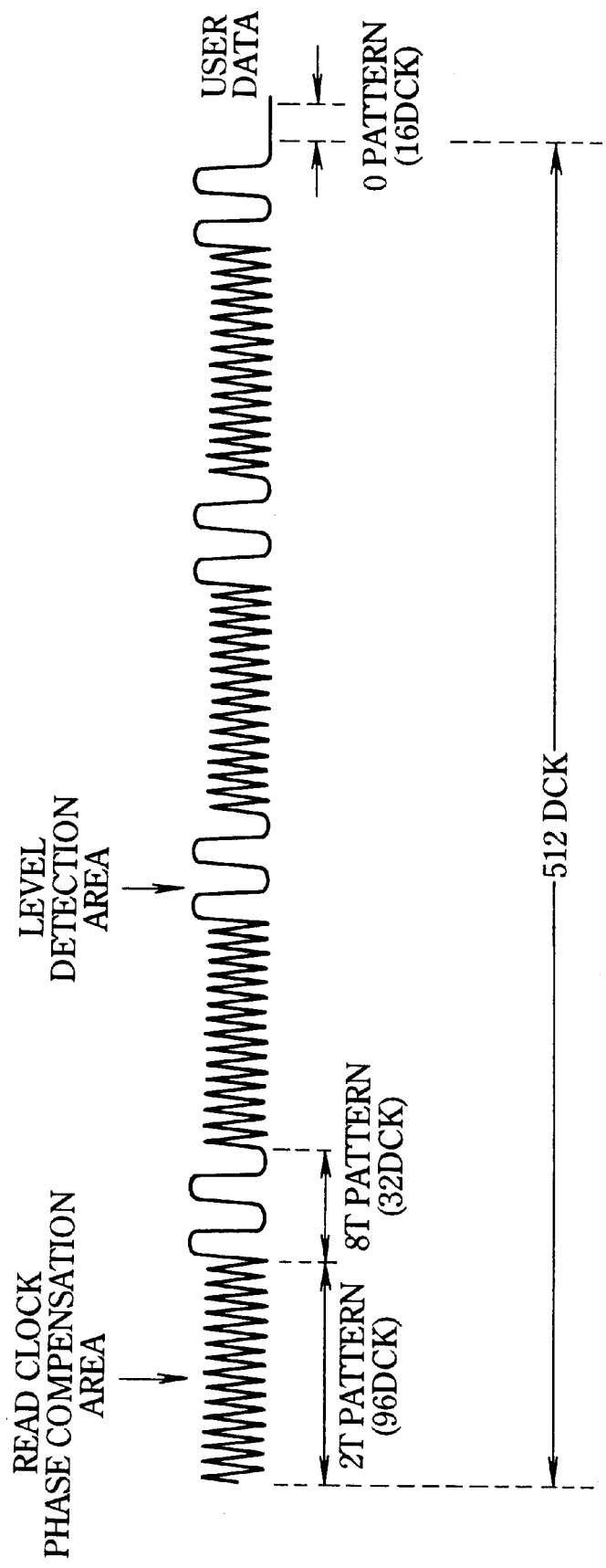
FIG. 10 shows playback signals which is based on a reference pattern of the data sector of the optical disc.

Referring to FIG. 10, showing the waveform of playback signals of the reference data, four blocks, each consisting of 4 bytes of 8T patterns and 12 bytes of 2T patterns, and 2 bytes of all 0s as allowance for setting the detected information, are recorded as the reference data. The 8T pattern is employed for setting the three-value level (high H, mid M and low L) for data detection in viterbi decoding and partial response (1, 1), while the 2T pattern is used for correcting the dc-derived pit position shift, caused by e.g., recording power variation, during reproduction.

Figure 12:
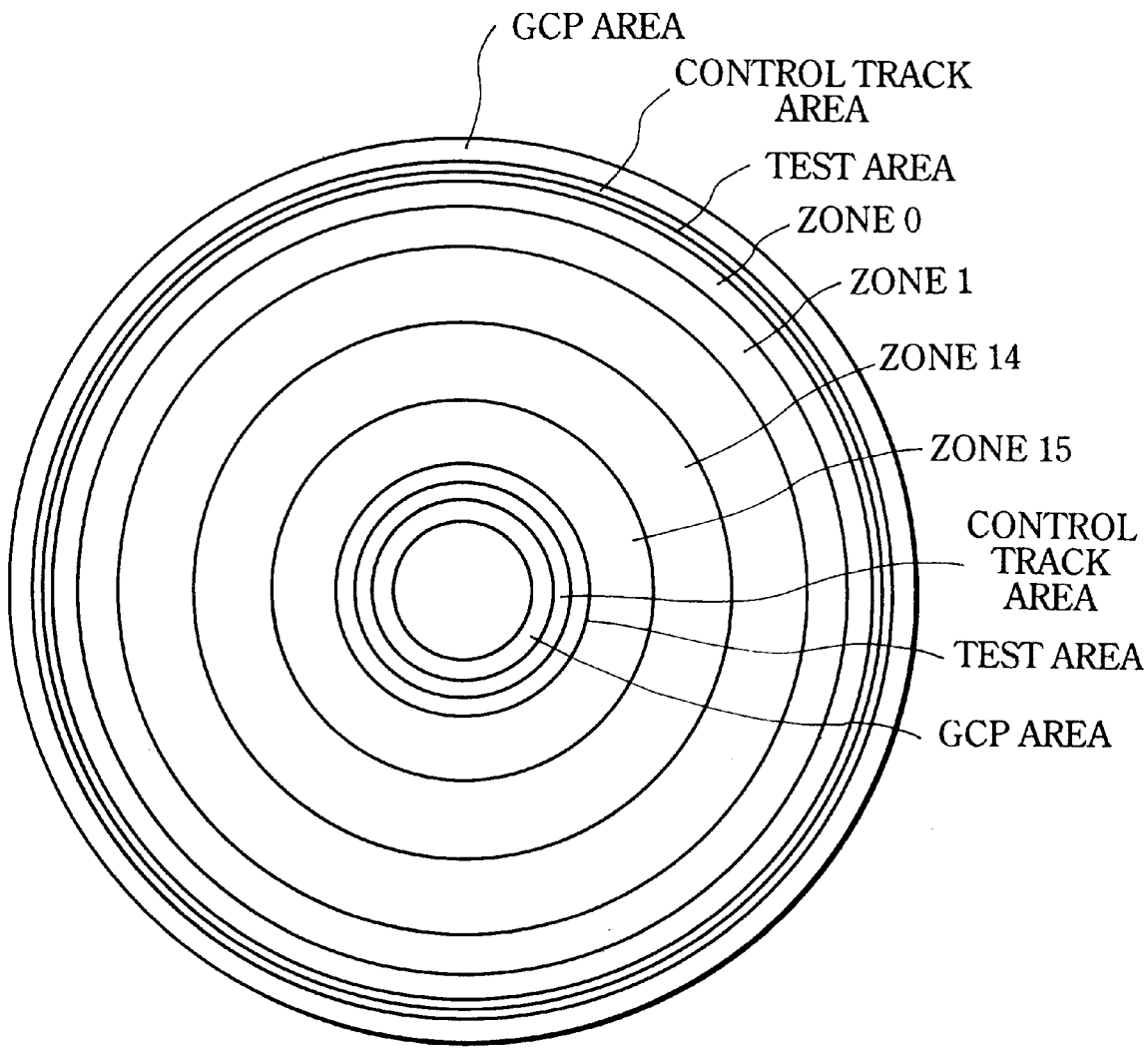
FIG. 12 shows the state of area division in the optical disc.

In the data area ARd of the data segment DSEG, data other than the 66 bytes of reference data are scrambled. The scrambled data are NRZI converted and recorded on the segment basis In addition, this optical disc is a so-called zone CAV disc, and is made up from the outer rim part of a gray code part area of 736 tracks, 2-track buffer track, 5-track control track, 2-track buffer track, 5-track control track, 848 track user zone 0, 864-track user zone 1, 880-track user zone 2, 912-track user zone 3, 944-track user zone 4, 976-track user zone 5, 1024-track user zone 6, 1056 track user zone 7, 1120 track user zone 8, 1184 track user zone 9, 1216 track user zone 10, 1296 track user zone 11, 1392 track user zone 12, 1488 track user zone 13, 1696 track user zone 14, 770 track user zone 15, 5-track test track, 2-track buffer track, 5-track control track, 2-track buffer track and 820-track GCP area, as shown in FIGS. 11 and 12.

If, with the number of tracks Tz in a zone, the number of data segments Dsz required for a sector in a zone, and the number of data segments per track of Dt, the sector is to be completed from zone to zone, and the number of sectors is to be constant, if suffices to decide the number of sectors so that the number of sectors Sz in a zone is $$Sz=Tz*Dt/Ssz$$

and $$Tz=K*Dsz$$

All parameters may be obtained by allocating the approximate data capacity per zone, obtained on dividing the data capacity of the entire disc by the total number of zones as the value of K, from the outer rim side zone, and determining the data clock frequency so that the recording density of the inner most track of the zone will not exceed a pre-set density. The sector capacity is assumed to be constant at 2352 bytes.

Figure 13:
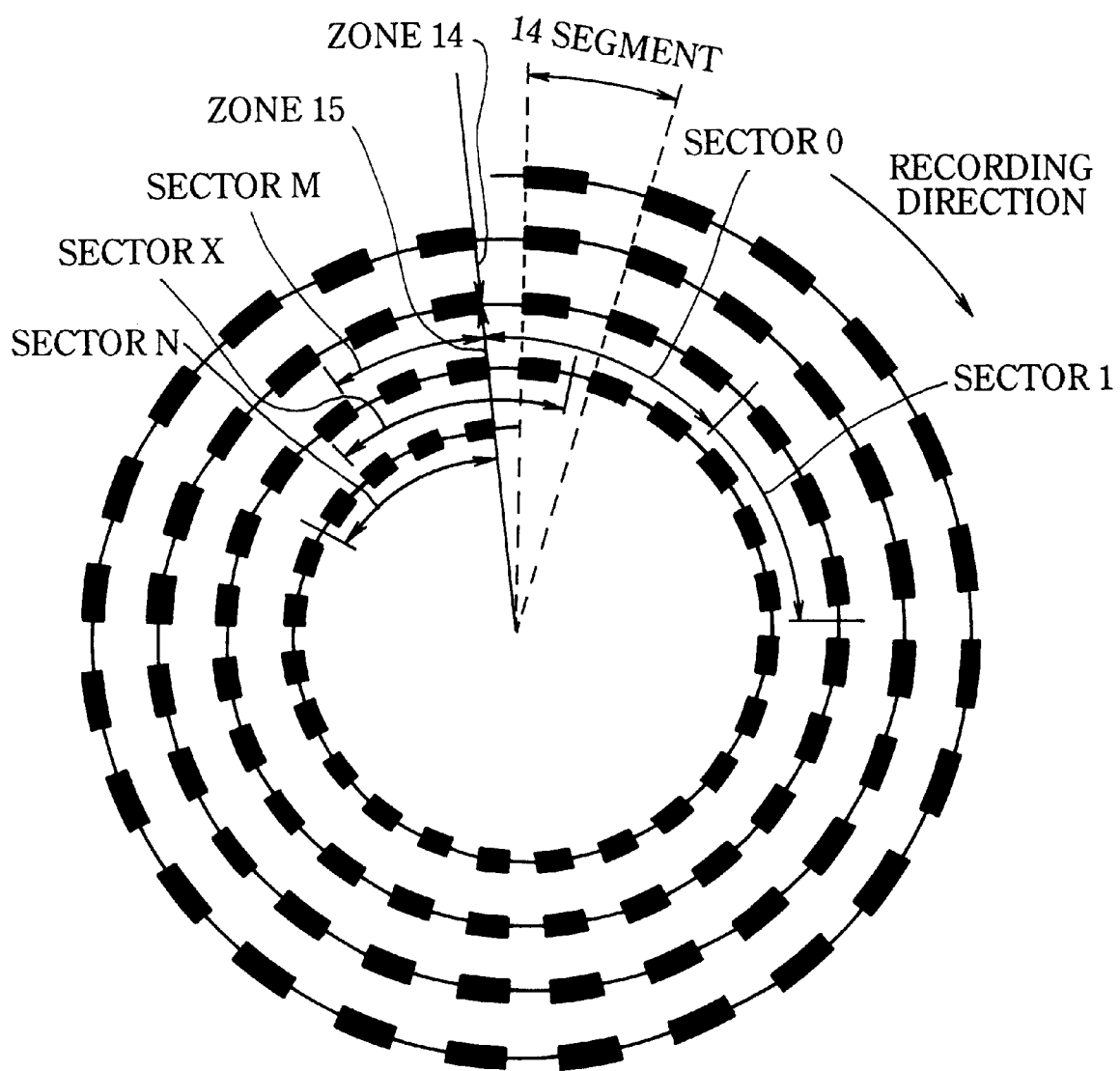
FIG. 13 shows a data format in the optical disc.

In this case, a sector is started at a certain segment, the sector is terminated if the number of segments making up one sector is terminated and the next sector is started as from the next segment without starting the next sector at a redundant byte, if any, present in the last segment, as shown in FIG. 13.

Thus a sector may be constituted in which a segment 0 of the frame code 0 is at the leading end of a zone. If a parity sector is provided for a number of sectors, the capacity of a parity sector may be rendered constant by uniforming the number of sectors for each zone.

The number of sectors in the inner most zone is likely to be not the same as the number of the other zone by reason of the recording area. Thus the track in which the sector is terminated at the segment 1399 is to be the inner most zone.

The optical disc has the user zone divided into 16 zones as described above and the number of data bytes per segment (bytes/seg) and the number of segments per sector (seg/sector) are determined by data clocks DCK generated by multiplying the servo clock SCK by MIN where M is the value of the clock in FIG. 11 and N is equal to 24. That is, if the number of servo clocks in the servo area ARs is N and the data clocks DCK is the servo clock SCK times M/N, the number of servo clocks SCKseg and the number of data clocks DCKseg in one segment are given respectively by SCKseg=9N, and DCKseg=SCKsegM/N, where M and N are integers.

Figure 14:
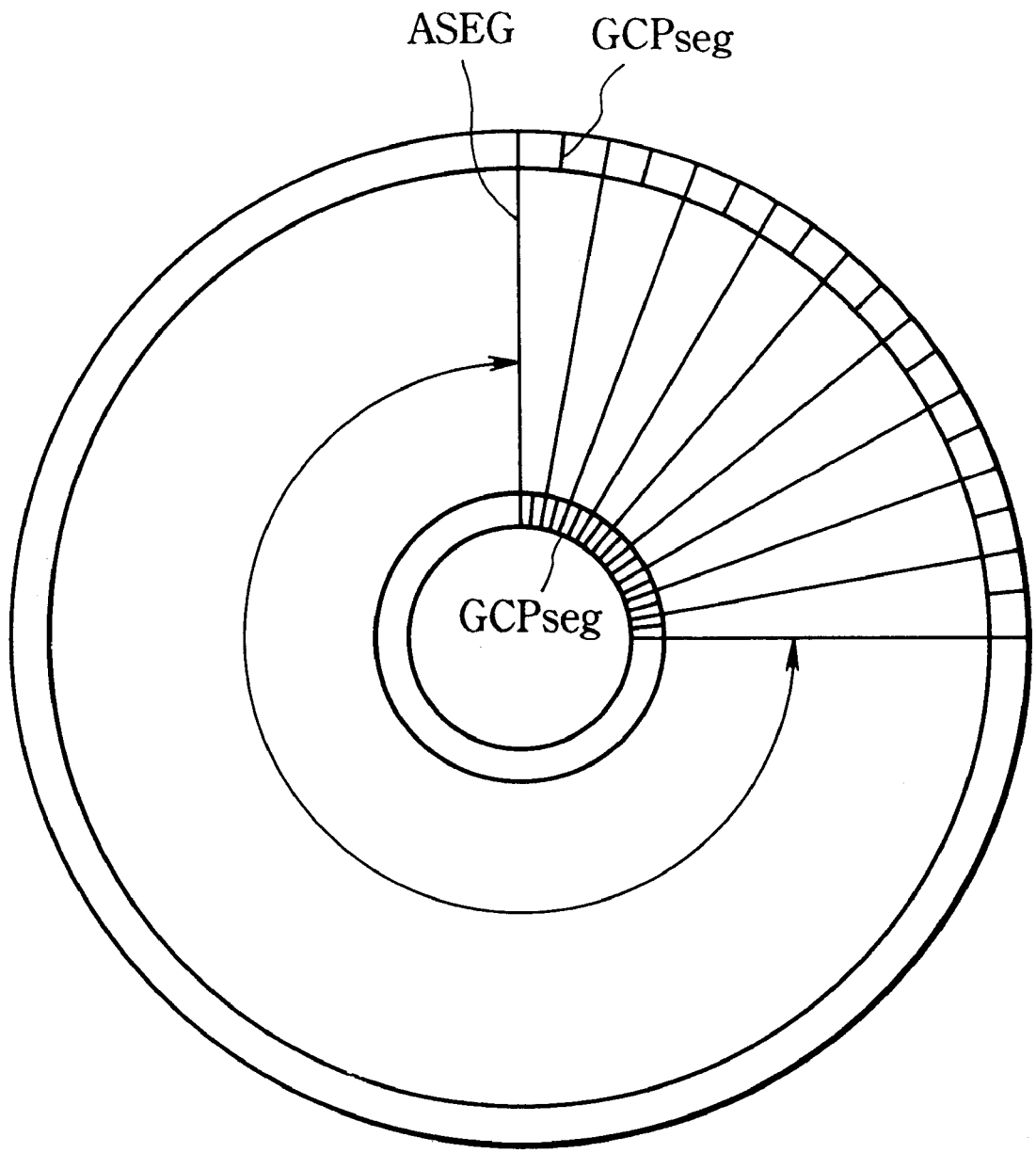
FIG. 14 shows the arraying state of a GCP segment in the optical disc.

Meanwhile, each track is divided into 1400 segments, of which 1300 segments are data segments DSEG. In the GCP area, the user data is not recorded. Therefore, 100 of the 1300 data segments DSEG are used as GCP segment GCPseg for storing the GCP information such as media information. The GCP segment GCPseg is allocated to a data segment at a mid position of each address segment ASEG as shown in FIG. 14.

Figure 15:
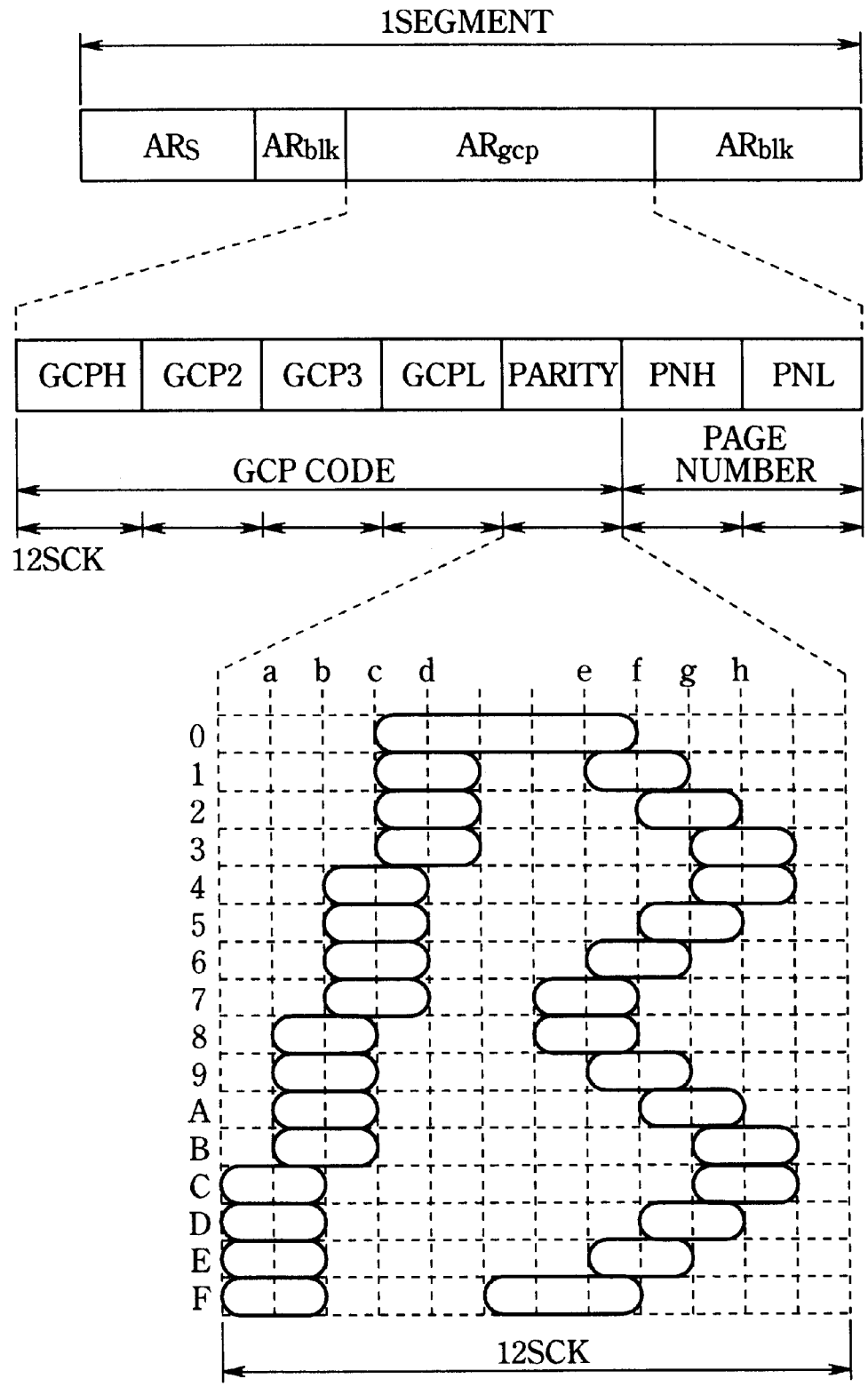
FIG. 15 shows the construction of the GCP segment.

The GCPO segment GCPseg is made up of the servo area ARs, the GCP area ARgcp and a blank ARblk, as shown in FIG. 15. In the GCP area ARgcp, there are recorded by pits seven 4-bit data coded in the gray code representation in the same way as for the access code ACC for the address segment ASEG, namely the GCP codes [GCPH], [GCP2], [GCP3] and [GCPL] and parity [P] and page numbers [PNH] and [PNL].

To the GCP code is appended the parity [P] in order to permit error detection. The page numbers [PNH] and [PNL] are also appended in order to give plural information data on media or the like as the GCP information. If the page numbers [PNH] and [PNL] are up to 16 pages, the same information may be recorded as [PNH] and [PNL] for providing protection against errors.

Figure 16:
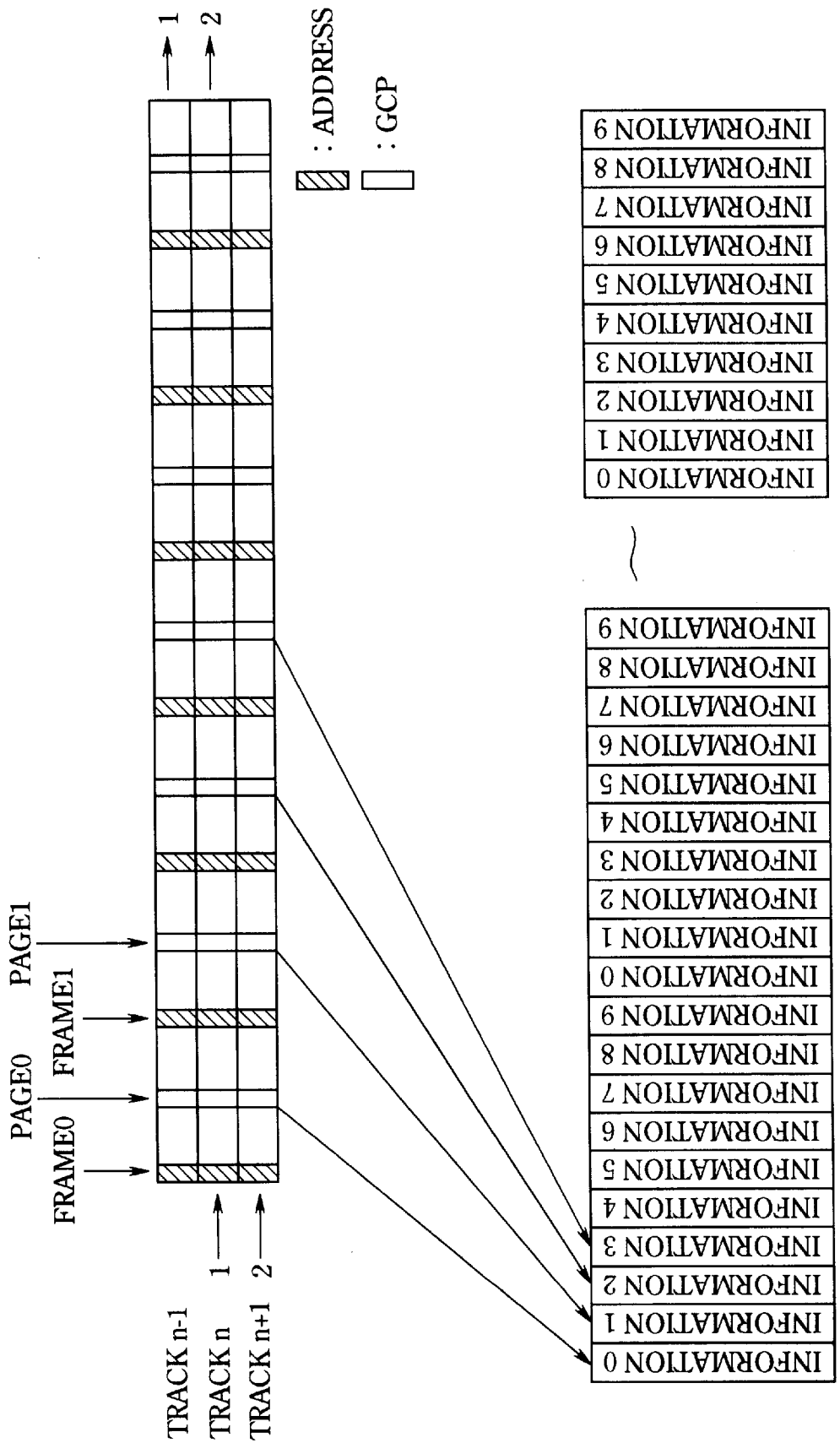
FIG. 16 shows the relation between the page number of the GCP segment and the frame address of the address segment.

By arranging the respective GCP segments GCPseg in the state in which lower one digit number of the address recorded in the address segment ASEG (frame number) is coincident with the page number of the GCP segment GCPseg, as shown in FIG. 16, readout errors in the page number of the GCP segment GCPseg may be eliminated. Since there are 100 frames in each track turn, 10 pages or 10 sorts of the GCP information may be repeatedly recorded ten times for reducing the opportunity of misreading of the ten sorts of the GCP information.

Figure 17:
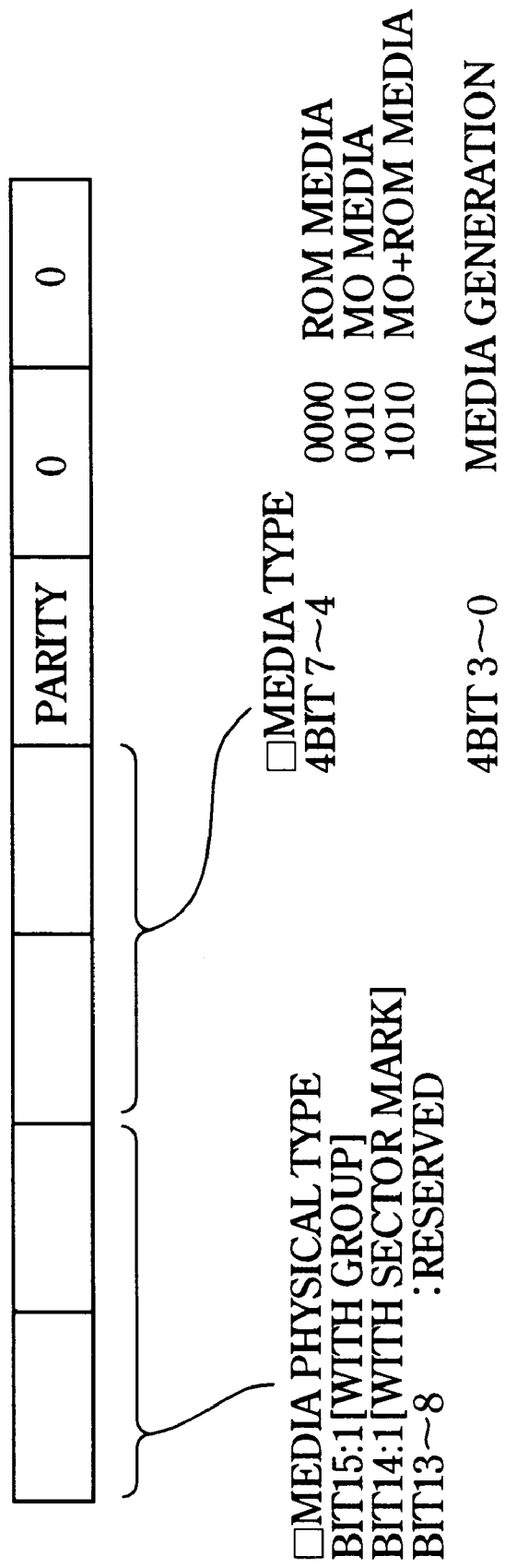
FIG. 17 shows the contents of the GCP information of a page number 1 of the GCP segment.

As for the GCP information recorded on the GCP segment GCPseg, the page number 0 is the information giving the media information/media type, as shown in FIG. 17. The bits 15 to 14 give the information concerning the physical format of the media, such as the possible presence of the groove or sector marks, the bits 7 to 4 give the information as to the media form, such as Mo or ROM and bits 3 to 0 give the media generation information.

Figure 18:
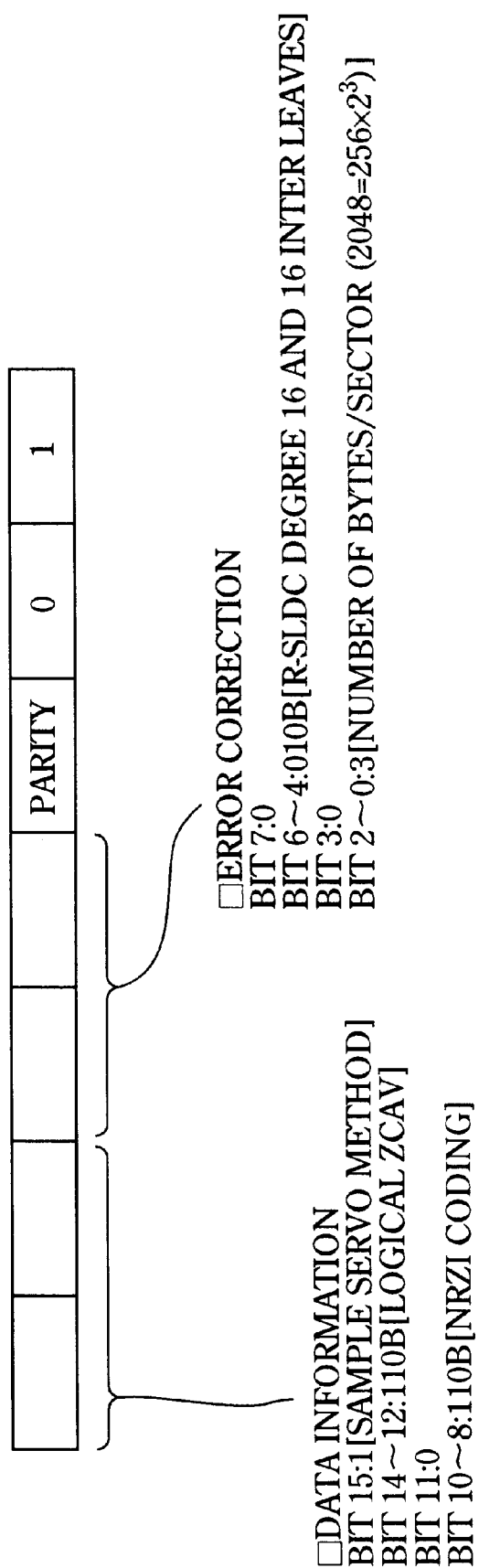
FIG. 18 shows the contents of the GCP information of a page number 2 of the GCP segment.

The GCP information of the page number 1 is the information specifying the data information/error correction form, as shown in FIG. 18. The bits 15 to 8 give the data information specifying the sample servo system, logical CAV or NRZI coding etc. and bits 7 to 0 give the information specifying the error correction codes.

Figure 19:
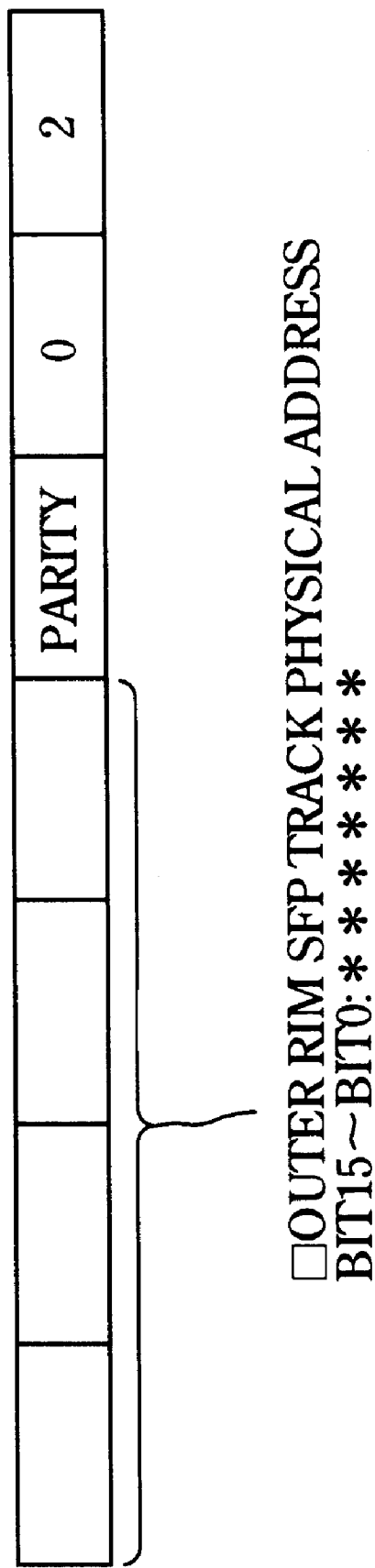
FIG. 19 shows the contents of the GCP information of a page number 3 of the GCP segment.

The GCP information of the page number 2 is the information specifying the outer rim SFP track physical address and the bits 15 to 0 give the information specifying the physical address of the outer rim side control track, as shown in FIG. 19.

Figure 20:
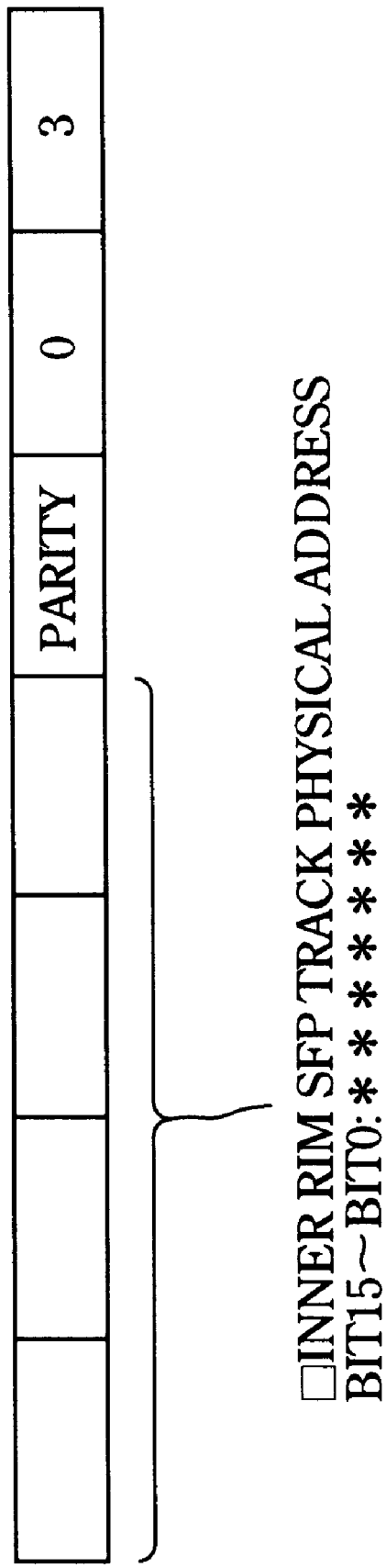
FIG. 20 shows the contents of the GCP information of a page number 4 of the GCP segment.
Figure 21:
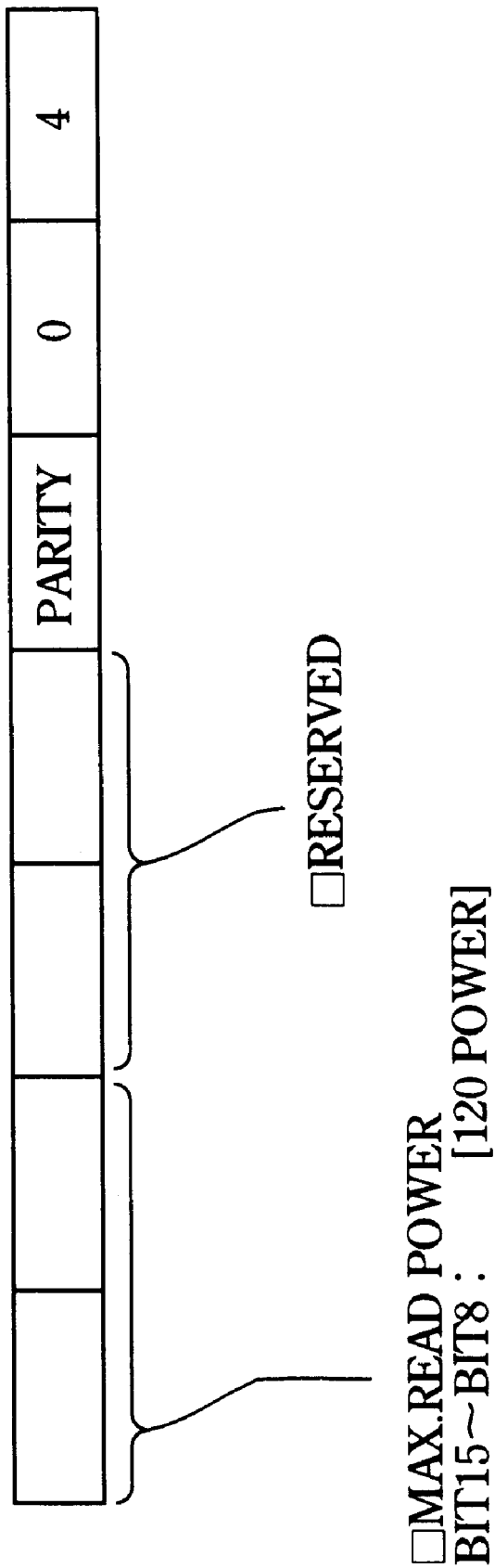
FIG. 21 shows the contents of the GCP information of a page number 5 of the GCP segment.

The GCP information of the page number 3 is the information specifying the inner rim SFP track physical address and the bits 15 to 0 give the information specifying the physical address of the inner rim side control track, as shown in FIG. 20.

Figure 22:
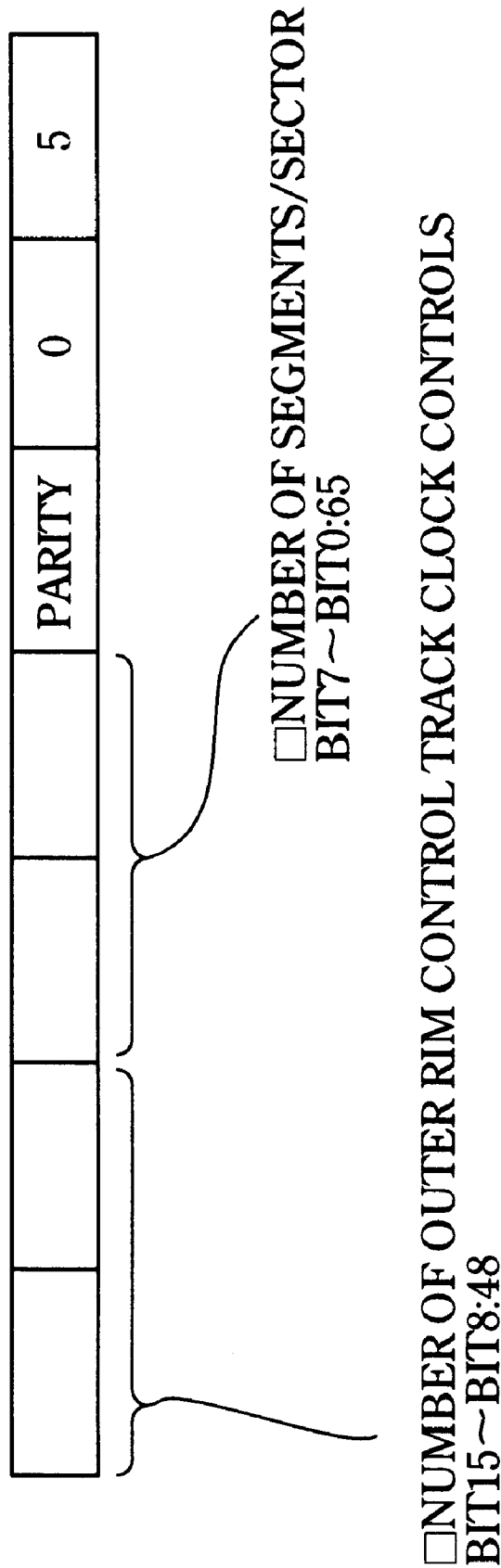
FIG. 22 shows the contents of the GCP information of a page number 6 of the GCP segment.

The GCP information of the page number 5 is the information specifying the outer rim control track clock ratio/ number of segments per sector as shown in FIG. 22. Bits 15 to 8 give the information specifying the number of clocks of the outer rim control track, that is the value of the clock M of FIG. 11 and bits 7 to 0 specify the information specifying the number of segments per sector.

Figure 23:
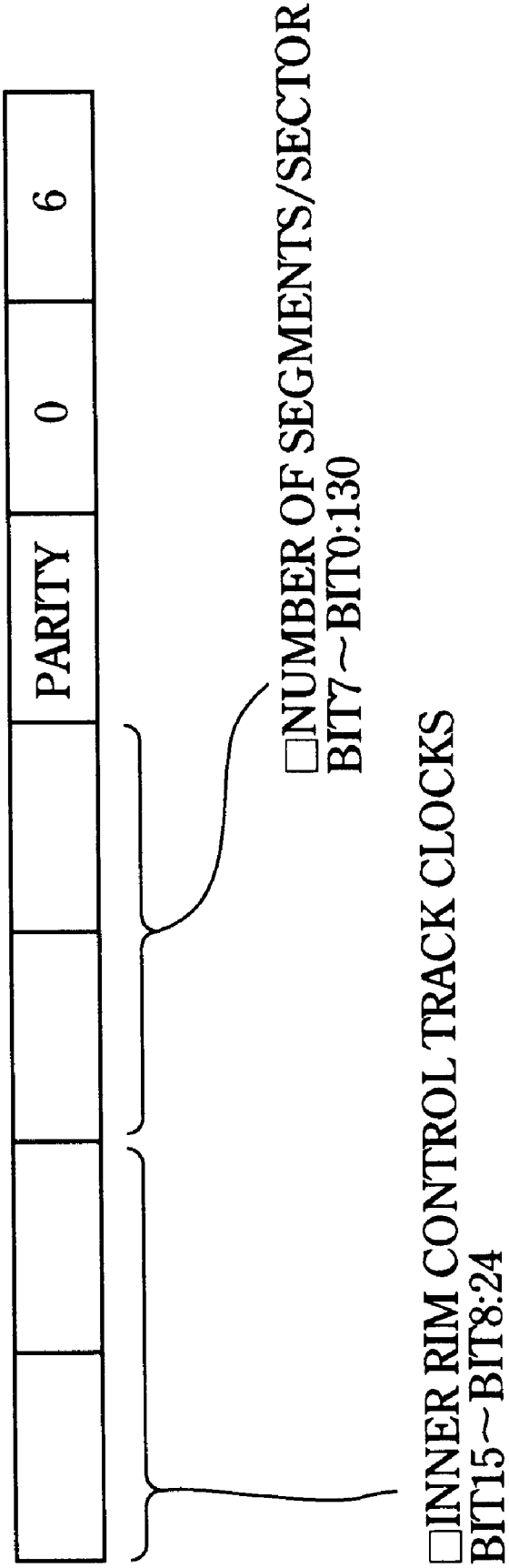
FIG. 23 shows the contents of the GCP information of a page number 7 of the GCP segment.
Figure 24:
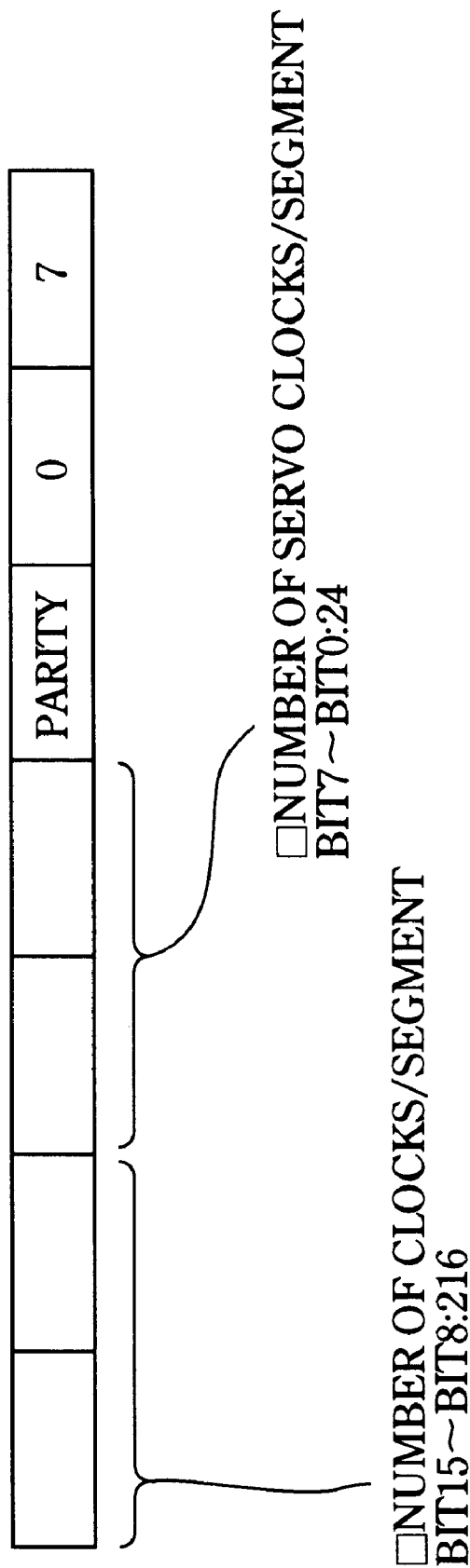
FIG. 24 shows the contents of the GCP information of a page number 8 of the GCP segment.

The GCP information of the page number 6 is the information specifying the inner rim control track clock ratio/ number of segments per sector as shown in FIG. 23. Bits 15 to 8 give the information specifying the number of clocks of the outer rim control track, that is the value of the clock M of FIG. 11 and bits 7 to 0 specify the information specifying the number of segments per sector. The GCP information of page number 7 is the information specifying the number of cocks per segment/number of servo clocks per segment, as shown in FIG. 24. Bits 15 to 8 give the information specifying the number of clocks per segment and bits 7 to 0 give the information specifying the number of servo clocks per segment.

Figure 25:
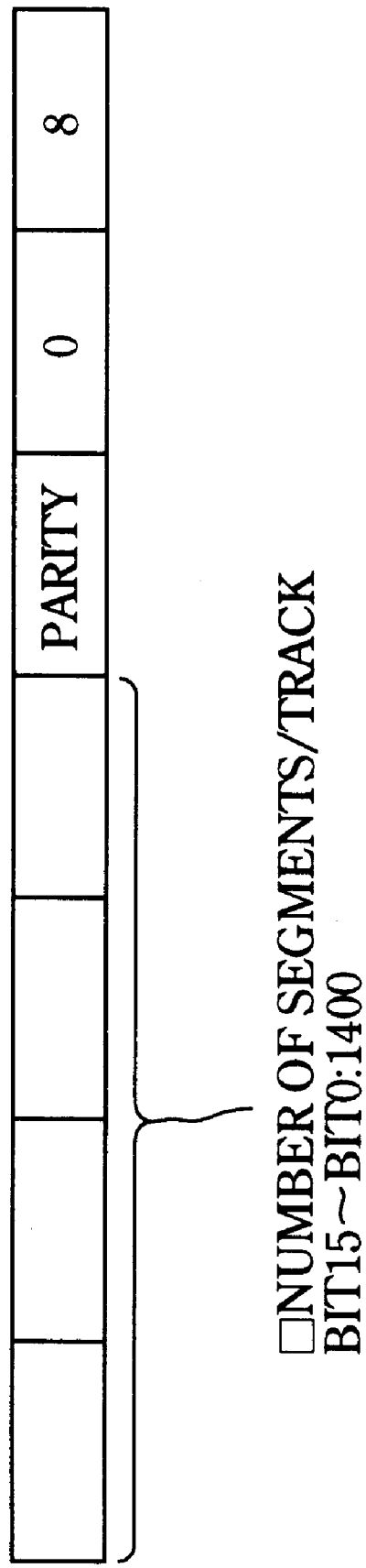
FIG. 25 shows the contents of the GCP information of a page number 9 of the GCP segment.

The GCP information of page number 8 is the information specifying the number of segments per track, as shown in FIG. 25. Bits 15 to 0 give the information specifying the number of segments per track.

Figure 26:
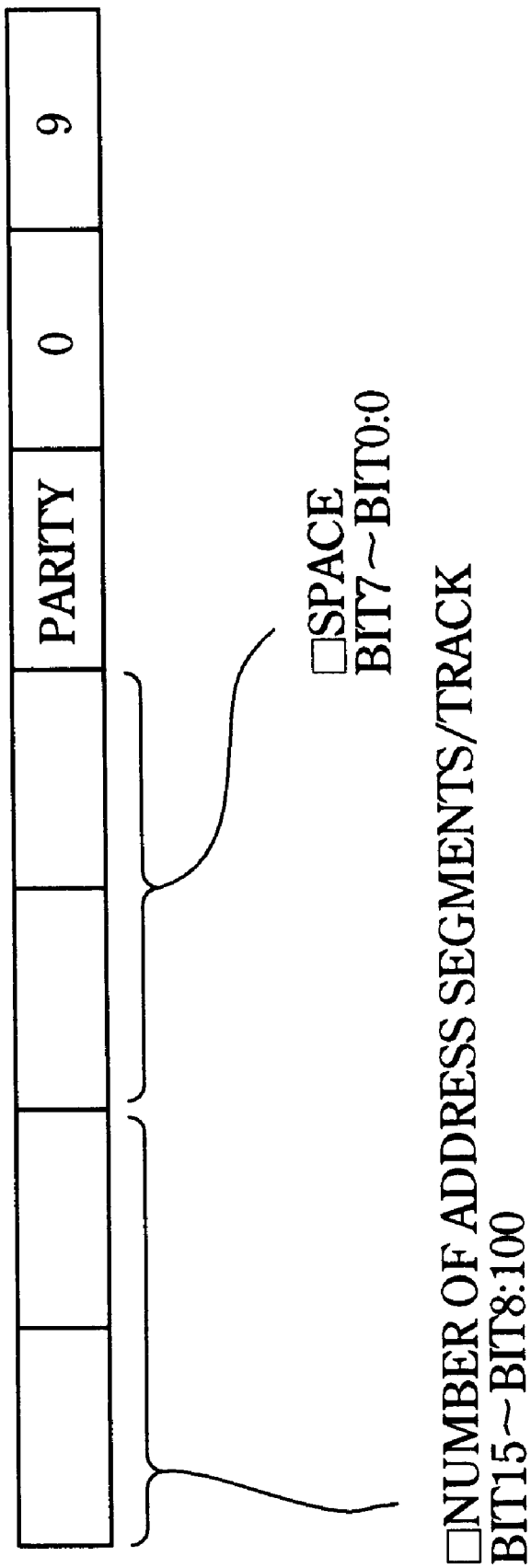
FIG. 26 shows the contents of the GCP information of a page number 10 of the GCP segment.

The GCP information of page number 9 is the information specifying the number of address segments per track/spare, as shown in FIG. 26. Bits 15 to 8 give the information specifying the number of address segments per track and bits 7 to 0 is the spare information.

On the control track are recorded the above-mentioned 20-byte GCP information, laser wavelength, reflectance or track pitch, 10 bytes of media information, the number of bytes or various physical tracks or data fields, number of data clocks of various areas, and number of zones, and 320 bytes of the band information such as zone definition data.

By recording the information A specifying the number of tracks per track (1 byte) (A=number of segment/track), the information B specifying the start track number of each zone (2 bytes), the information specifying the total number of tracks of each zone (2 bytes) and the information D specifying the number of segments per sector (1 byte) (D=number of segments/sector), the physical track address or the physical segment address may be found from the serial sector address in the following manner.

That is, by converting the serial sector address into zone number E and offset number F using a table, and by executing an operation $F \times D/A = G$ (product) ... $H$ (remainder)

from the offset number F, the physical track address and the physical segment address may be calculated within the zone by Physical track address=$B+G$ Physical Segment Address=$H$ As described above, with the optical disc of the embodiment illustrated, the address mark ADM or the sector marks STM1 and STM2 are recorded in the servo area ARs, the information specifying the address segment ASEG or the leading end of the sector may be given without increasing redundancy of the data area ARd. Since each sector mark STM1, STM2 specifies the leading end data segment DSEG of the sector or a segment directly before the leading end data segment, the sector is not defective even if one of the sector marks is defective, thus lowering the rate of occurrence of defective sectors. With the above-mentioned optical disc, by recording servo pits having a length corresponding to two clocks with respect to the generated servo clocks SCK in the servo area ARs, the mirror portion in the servo area ARs may be reduced, thereby reducing ghost pits generated during disc molding. By having a pit distance of not less than 5 shortest pit widths, data interference may be suppressed for giving stable servo signals.

On the other hand, since scrambled recording data are recorded as NRZI modulated data on the optical disc, the recording pattern is randomized and the probability of fixed patterns being continuously generated may be lowered. Thus the disc molding may be stabilized and the memory capacity of the reproducing apparatus in viterbi decoding may be reduced.

In addition, it is possible with the above optical disc to secure residual heating time by the laser beam by the pre-write area $AR_{PR}$ and post-write area $AR_{PO}$ provided in ten data area ARd of the data segment DSEG, so that data may be recorded positively in the data area ARd.

In the above optical disc, since the servo information and the address information are given by the servo area ARs and the address segment ASEG provided at equiangularly divided positions, the address information may be read in the playback system by servo clocks SCK produced by the servo information without regard to data recording/reproduction, thereby enabling stable high speed seeking. Since plural zones with uniform number of sectors are equal in data capacity, there is no necessity of changing the numbers of the parity sectors or exchange sectors from zone to zone, thus simplifying the control software.

On the other hand, since the last segment of a zone is continuous to the start segment of the next zone, no wasteful segments are produced. In addition, since the start segment in each zone is arranged at the same position of each track, and each zone is started from the segment of the same segment number, zone management may be facilitated.

In addition, since the GCP area across plural tracks give the media information in the gray code with the same format as that of the address information recorded in the address segment ASEG, the decoder for detecting the address information may be used simultaneously as a decoder for exclusively reading out the media information by the reproducing apparatus. There is no necessity of a special signal generator during cutting. In addition, the address information may also be read during readout of the GCP area by the reproducing apparatus, so that the pickup position may be managed positively.

With the optical disc, the media information specifying the sort of the medium or the format may be given by the GCP area to the reproducing apparatus.

It is also possible with the optical disc to supply the information for reading the control track information by the GCP area.

Since the media information of the same contents are given by the GCP area for one track turn, the media information of high reliability may be given to the reproducing apparatus.

Since each segment disposed radially of each track of the GCP area of the optical disc gives the same media information, the media information may be read out without applying tracking on the reproducing apparatus.

In addition, since the GCP area provided in the vicinity of the inner and outer rims of the optical disc gives the same media information, any of the inner rim side access start or the outer rim side access start may be selected on the side of the reproducing apparatus.

Figure 27:
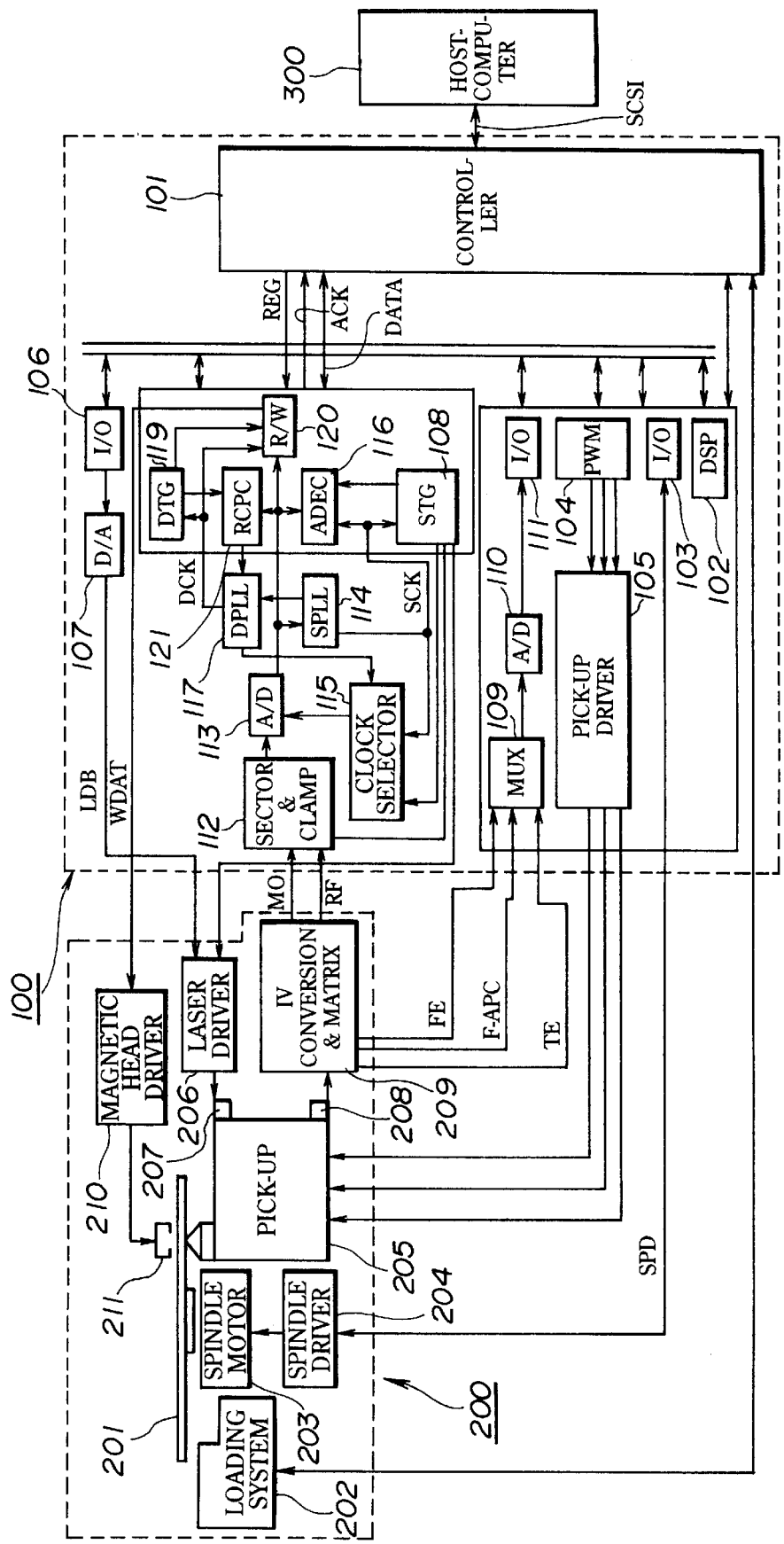
FIG. 27 is a block diagram showing the constitution of an optical disc driving device according to the present invention.

The recording/reproducing apparatus having the MO disc and ROM disc having such format is comprised of a control circuit block and a disc drive 200, as shown in FIG. 27. The basic arrangement of the recording/reproducing apparatus shown in FIG. 27 is the same as shown in JP Patent Application No.5-24542. With the present recording/ reproducing apparatus, exchange of commands and data is executed with the host computer connected via the SCSI interface.

Processing for exchange of commands and data is by a controller 101 of the control circuit block 100. The controller 101 appends CRC and error correction codes to data from the host computer 300 during recording and transfers the data to the disc drive 200. For reproduction, data from the disc drive 200 is corrected for errors and user data portions are transferred to the host computer 300. Commands to the servo system and respective blocks of the disc drive 200 are given by a digital signal processor (DSP) 102 which performs necessary processing responsive to commands from the controller 101.

Figure 28:
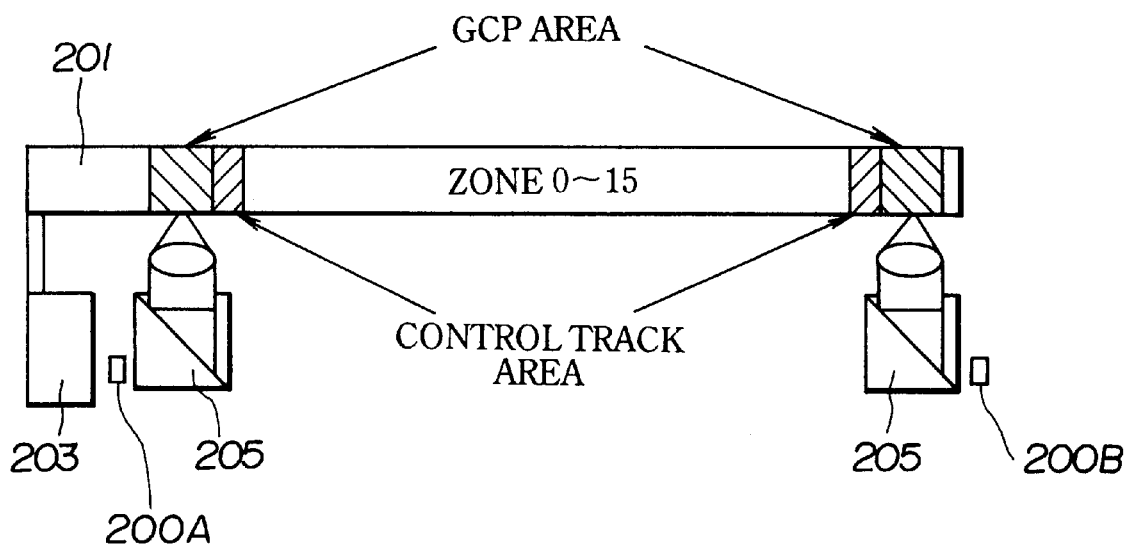
FIG. 28 illustrates the focusing capturing in the optical disc driving device.

With the present recording/reproducing apparatus, the DSP 102 is responsive to a request from the host computer 300 in the state in which the optical disc 201 is loaded by a loading unit 200 on a spindle motor 203 to command a spindle driver 204 via an I/O block 103 to run the spindle motor 203 in rotation. The DSP may also issue a similar command when the optical disc 201 is loaded when the automatic spin mode is set. When the spindle motor 203 reaches a pre-set rpm, the spindle driver 204 issues a spindle on/off signal SPD to apprise the DSP 102 that the rotation has been stabilized. During this time, the DSP 102 shifts an optical pickup 205 by the pickup driver 105 via a pulse width modulating (PWM) circuit 104 until it is caused to bear against stops 200A, 200B in the vicinity of the outer or inner rim of the optical disc 201 for positioning a beam spot in the recording area, that is in e.g., a GCP area outside the zones 0 to 15, as shown in FIG. 28. If focusing is captured in the recording area, there is a risk of inadvertent data erasure if the disc is a highly sensitive disc, such as MO disc. By capturing focusing in an area having data formed by pits, such as the GCP area, outside the recording area, inadvertent data erasure may be prohibited from occurrence.

It is possible with the DSP 102 to discern whether the optical disc 201 is the replay-only optical disc or a recordable MO disc. Since the media information is recorded in the GCP area in the gray code and with the same format as that of the address information, the address information and the media information may be read and discerned by the same method. In addition, since the media information in the gray code is recorded in the GCP area of plural tracks, the media information may be reliably read even if the beam spot position control is inaccurate.

When the spindle motor 203 reaches a constant rpm and the pickup 205 is moved to e.g. the vicinity of the outer rim, the DSP 102 sets a bias current LDB for a laser diode 207 provided in the optical pickup 205 for a laser driver 206 via a D/A converter 107 from the I/O block 106 and issues a command to a servo timing generator (STG) 108 controlling the on/off of the laser diode 207 to emit a laser light. The bias current LDB is set to a high level and to a low level during recording and reproduction, respectively. When the laser light is emitted by the laser diode 207, the laser light enters a photodetector 208 provided in the optical pickup 205 and a detection output by the photodetector 208 enters a multiplexor 109 as a front APC signal F-APC converted into a voltage by an I-V conversion block via a current-voltage (I-V) conversion and matrix amplifier 209.

The front APC signal F-APC is digitized by an A/D converter 110 as a signal time-divisionally multiplexed by the multiplexor 109 so as to enter the DSP 102 via I/O block 111. The DSP 102 recognizes the light volume of the laser light by the digitized front APC signal F-APC and varies the bias current LDB based upon the light volume control data calculated by the enclosed digital filter for controlling the outgoing light from the laser diode 207 to be constant.

The DSP 102 causes the current to flow from the PWM circuit 104 to the focusing driver of the pickup driver 105 for vertically driving the focussing actuator of the pickup 205 for focusing search state. The laser light reflected back from the optical disc 201 is detected by the photodetector 208. A detection output of the photodetector 208 is converted by an I-V conversion block of the I-V conversion and matrix amplifier 209 into a voltage which is supplied as a focussing error signal FE to a multiplexor 109.

Similarly to the front APC signal F-APC, the focusing error signal FE is digitized by the A/D converter 110 as a signal time-divisionally selected signal by the multiplexor 109 so as to enter the DSP 102 via the I/O block 111. The DSP 103 feeds back the focusing control data obtained on digitally filtering the focusing error signal via the PWM circuit 104 to the focusing driver of the pickup driver 105 for constituting a focusing control servo loop. When the focusing control becomes stabilized, RF signals (for ROM disc) or MO signals (for data area of MO disc) from the pre-write area $AR_{PR}$ obtained by the I-V conversion and matrix amplifier 209 from a detection output by the photodetector 208 has its amplitude stabilized to some extent and is converted by an A/D converter 113 into analog signals after being clamped by a selector and clamp 112. By performing clamping using the pre-write area $AR_{PR}$, stable signals can be produced and an accurate clamping operation may be achieved.

The A/D converter 113 is selectively fed with the servo clock signal via a clock selector 115 from a servo clock generating (SPLL) circuit 114 or a data clock signal DCK from a data clock generating (DPLL) circuit 117. The clock selector 115 is controlled by a servo timing generator (STG) 108 for selecting the servo clock signal SCK responsive to the playback RF signals from the servo area and for selecting the data clock signal DCK responsive to the playback signal from the data area.

The clocks during servo capture operation are of a frequency in the free-running state of the servo clock generating (SPLL) circuit 114. For the timing pulse during clamping, a signal obtained on frequency-dividing the servo clock signal of the free-running frequency by a pre-set value is employed.

Figure 29:
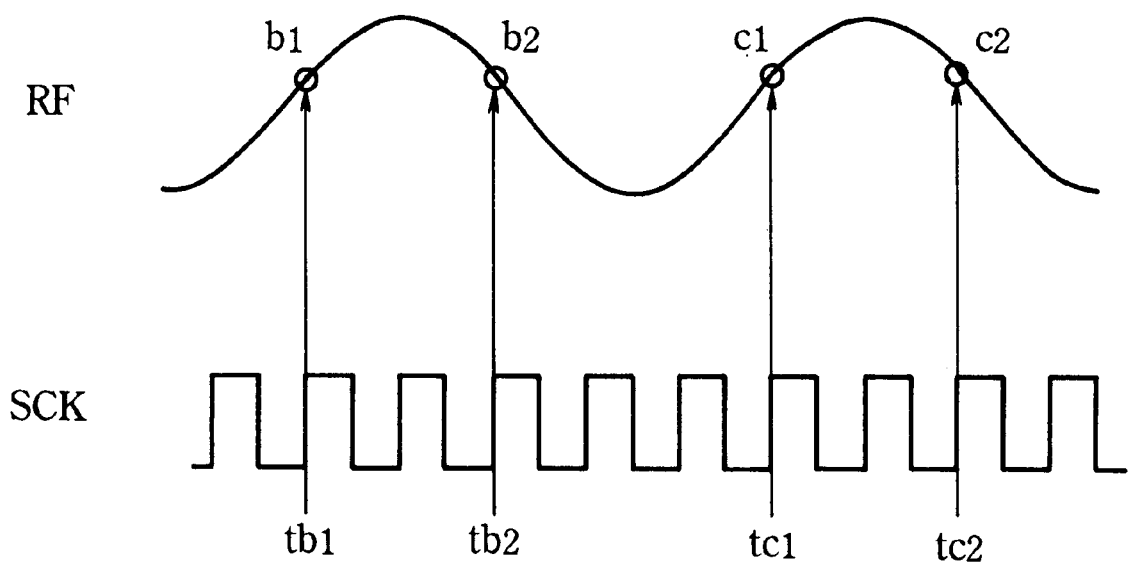
FIG. 29 is a timing chart showing the sampling timing for taking out the clock information from the playback signal waveform of wobbling pits in the optical disc driving device.

The SPLL circuit 114 checks the amplitude of RF signals digitized by the A/D converter 113 to check a bit patterning order to search the same pattern as that of a pre-set pit row in the servo area. If this pattern is found, the window is opened at a timing of appearance of the next pattern, that is at a servo area of the next frame, and checks for possible pattern coincidence. If this operation is confirmed a pre-set number of times, the phase of the servo clock SCK generated by the SPLL circuit 114 is deemed to be locked with respect to the phase of rotation of the optical disc. From sampling data b1, b2 of sampling points at both shoulders spaced one servo clock towards front and back from the center point of the playback RF signal waveform with respect to the wobbling pit Pb sampled at timings $T_{b1}$, $t_{b2}$, $t_{c1}$ and $t_{c2}$ of the servo clocks and sampling data b1, b2 of sampling points at both shoulders spaced one servo clock towards front and back from the center point of the playback RF signal waveform with respect to the wobbling pit Pc, an operation (phase error data)=[(b2−b1)+(c2−c1)]/2 is carried out for detecting the phase error of the servo clocks SCK and servo data, as shown in FIG. 29. Thus the phase information is obtained by taking an amplitude difference at both shoulders of the wobbling pits Pb and Pc within the servo area. The phase information derived from the two wobbling pits is added to the phase information for absorbing gain variation produced form amplitude changes due to the tracking position.

Figure 3:
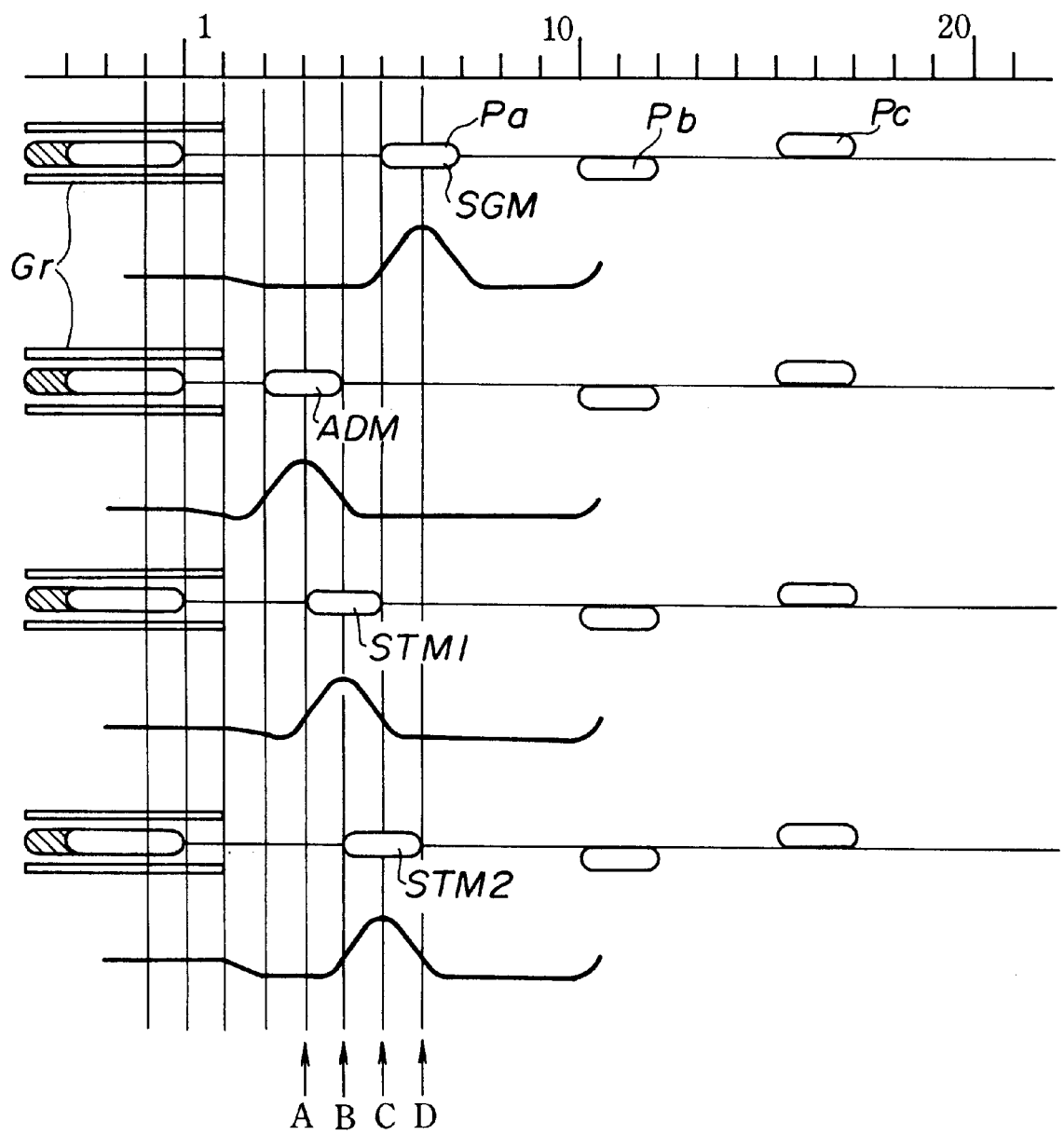
FIG. 3 shows a detection system for detecting a first pit in the servo area in the above optical disc.

If the SPLL circuit 114 is locked, it is possible for the optical disc reproducing apparatus to recognize the scanning position of the pickup 205 on the segment basis, so that the position of the first pit Pa can be recognized. Four windows A, B, C and D shown in FIG. 3 are opened and the position which gives the maximum amplitude among the RF signals samples at the four positions A to D is searched. If the result is the position A, it can be recognized that the address mark is the address mark ADM and this segment is the address segment at the leading end of the frame. Thus it becomes possible to clear an enclosed frame counter, not shown, for frame synchronization. Since each frame is made up of 14 segments, a window is opened every 14 segments. If continuous recognition as an address mark is possible, frame synchronization is judged to be locked.

On frame synchronization, the address recording position can be recognized, so that the access code ACC and the frame code FRC are decoded by an address decoder (ADEC) 116. With the ADEC 116, the pattern of four bits coded in a gray code is decoded by checking the coincidence with the gray code table shown in FIG. 4. The ADEC 116 samples the playback RF signals at positions a, b, c and d shown in FIG. 4 and finds the maximum amplitude position by a differential detection method. Similarly, the playback RF signals are sampled at respective positions e, f, g and h shown in FIG. 4 and the maximum amplitude position is found in order to effect decoding by the combination and the gray code table. By the above process, the track address. [AM] to [AL], parity [P], and the frame address [FM] and [FL] are decoded and the decoded results are stored in a register. When the data is established, the DSP 102 reads out the decoded results stored in the register for detecting the current position of the pickup 205. Since it is not the four bits but the entire pattern that is coded in gray code, comparison with an inverted table or a non-inverted table is executed depending upon whether the LSB of the upper four bits is [1] or [0]. If, when the initially decoded frame code FRC is loaded on a frame counter, and a number obtained on incrementing the frame counter on the frame basis is compared to the actually reproduced frame code FRC, continuous coincidence is confirmed, rotation synchronization is deemed to be established. By returning the number obtained from the frame counter as the fame code FRC to the DSP 102, there is no risk of the mistaken recognition of the frame position despite some defects.

The ADEC 116 decodes the GCP information in a similar manner to the track address and the frame code FRC. However, it is not the address segment but the decoded results stored in the register at the GCP segment GCPseg having the GCP information recorded thereon, that is read out. Thus the contents of the GCP area ARgcp may be confirmed.

On the other hand, the DSP 102 calculates the speed of movement of the pickup 205 as it reads the gray coded track address during seek for controlling the slide motor of the pickup driver 205 via a slide driver of the pickup driver 105 for the PWM circuit 104 for shifting the pickup 205 to a target track.

When the pickup 205 reaches the target track, the tracking operation is executed. The tracking error signal THE is obtained by taking a difference of the amplitudes of RF signals reproduced from wobbling pits in the servo area. The DSP 102 feeds back the tracking control data resulting from digitally filtering the difference value to the pickup driver 105 via the PWM circuit 104 for constituting a tracking controlling servo loop.

The leading position of the target sector is detected while tracking is applied. There are the sector marks STM1 and STM2 in the leading segment and a directly previous segment for each sector, as described above. The respective sector marks STM1, STM2 open the windows at the four positions A, B, C and D shown in FIG. 3. If the maximum amplitude position among the RF signals sampled at these four positions A to D is B, it specifies the leading end segment of the sector, whereas, if the maximum amplitude position is C, it specifies the segment directly previous to the sector. Basically, the segment at the leading end of the sector is determined by converting the sector address given by the host computer 300 into a physical sector and finding in which segment of which track the sector is located. The probability of the two kinds of sector marks becoming simultaneously defective is empirically not higher than $10^{-10}$, such that the probability of occurrence of defective sectors is extremely small.

The data clock generating circuit (DPLL) circuit 117 generates data clocks DCK obtained on multiplying the frame-synchronized servo clocks SCK obtained by the SPLL circuit 114 by M/N and sends the data clocks DCK to a timing generator 19 and a recording/reproducing circuit 120. The data clocks DCK generated by the data clock generating circuit (DPLL) 117 are phase-compensated by a read clock phase compensation (RCPC) circuit 121 based upon the phase in the read phase clock compensation area of the playback RF signals of the reference data shown in FIG. 10.

The recording/reproducing circuit 120 is fed during the recording mode with user data via the controller 101 from the host computer 300. The recording/reproducing circuit 120 has a scrambling circuit having the constitution shown in FIG. 30.

Figures 30, 31:
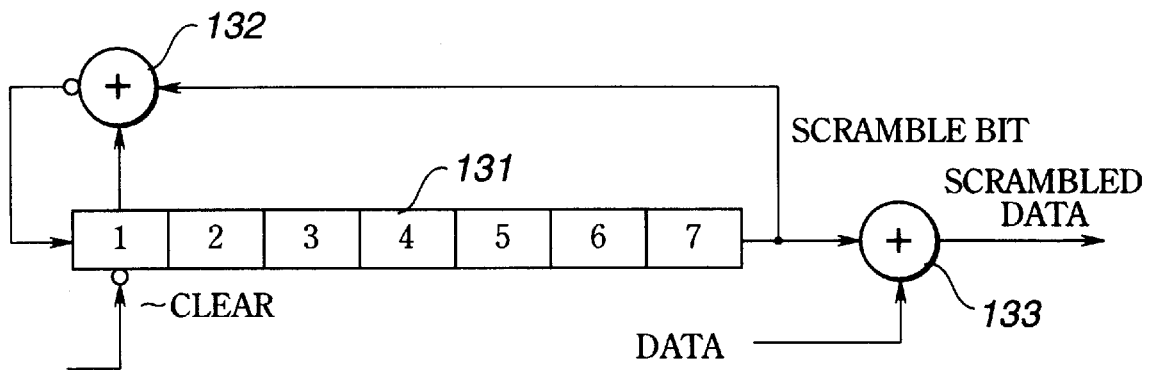
FIG. 30 is a block diagram showing the constitution of a scrambling circuit provided in a recording/reproducing circuit in the optical disc driving device.
FIG. 31 shows a scramble table of the scrambling circuit.

The scrambling circuit shown in FIG. 30 is made up of a 7-stage flipflop 131, a first adder 132 for EXORing the outputs of the first and last stages of the flipflop 131 for feeding back the result to the first stage of the flipflop 131 and a second adder 133 for EXORing the output of the first adder 132 and the recording data. By the flipflop 131 being cleared at each sector start timing, the scrambling circuit generates random numbers of 127 periods shown in a scramble table of FIG. 31 as an output of the first adder 132. On the other hand, by the second adder 133 EXORing the recording data and the random number, the scrambling circuit performs scrambling on the sector basis in accordance with $Y=X^7+X+1$.

The recording/reproducing circuit 120 modulates the scrambled user data into NRZI data synchronized with the data clocks DCK. The initial value of each segment is set to [0]. The modulated signal WDAT is fed via a magnetic head driver 210 to a magnetic head 211. The magnetic head 211 generates a magnetic field conforming to the modulated signal WDAT and applies the magnetic field to the data area ARd of the MO disc 201 superheated to the Curie temperature by a laser beam generated by the laser diode 207 for recording the NRZI data.

During recording, the laser drier 206 is controlled by the servo timing generator (STG) 108 so that the laser diode 207 will be switched from the playback driving power to the recording driving power at a timing of movement of the pickup 205 from the servo area to the pe-write area of the data area. The recording/reproducing circuit 120 is controlled by the data timing generator (DTG) 119 so that data of a specified polarity will be recorded in the pre-write area $AR_{PR}$ at a timing the optical pickup 205 traverses the pre-write area $AR_{PR}$. The data of the specified polarity means data of the same polarity as that of bulk erasure of the pre-write area AR$_{PR}$. By recording data of the same polarity as the bulk erasure direction on the pre-write area AR$_{PR}$, recorded data is not changed even if data is not regularly recorded on the pre-write area AR$_{PR}$ due to insufficient residual heat of the medium, so that stable signals may be reproduced.

During playback mode operation, the playback MO signal obtained by the I-V conversion and matrix amplifier 209 from the detected output by the photodetector 208 is converted into digital signals by the A/D converter 113 so as to be supplied to the recording/reproducing circuit 120. The recording/reproducing circuit 120 decodes the NRZI data by viterbi decoding after digitally filtering the playback MO signals digitized by the A/D converter 113 in conformity to partial response (1,1). The NRZI data is converted on the segment basis into the NRZI data which are descrambled on the sector basis into playback data which is transmitted via the controller 101 to the host computer 300.

The MO disc device employing partial response (1,1) and viterbi decoding has been shown in our JP Patent Publication A-5-225638.

By scrambling recording data in this manner, the data pattern is randomized so that the probability of the continuation of a data string having unified values at the time of decoding is small while the memory capacity for viterbi decoding may be reduced. In addition, since the bit array is randomized for the ROM disc, the bit presence/absence ratio on the disc approaches 50% thus facilitating disc molding.

With the present recording/reproducing apparatus, the concentrically or spirally extending track is divided into plural sectors comprised of plural segments composed of the servo area ARs and the data area ARd, and the address mark specifying the address segment ASEG having the track address recorded thereon, the data segment DSEG having the data of the leading end of the sector recorded thereon and the sector mark specifying the directly previous segment, are recorded in a servo area of a MO disc, in which the address mark and the sector marks recorded on the servo area ARs are detected by maximum differential value detection by reproduced signals of the servo area by recording/ reproducing means for recording/reproducing data on or from the target sector.

The recording/reproducing apparatus reads out the media information in the gray code pattern with the same format as the address information of the address segment ASEG and reads out the control information from the control track based upon the media information for performing control based upon the control information.

We claim:

1. An optical disc comprising a plurality of substantially concentrically extending tracks, each track including a plurality of frames, each frame including a plurality of segments, the plurality of segments including an address segment and a plurality of data segments, address information only being recorded in the address segment, each segment having a servo area and a data area, the servo area of each segment having a plurality of recording positions, wherein when a discrimination pit is in a first of the recording positions in a segment, the pit identifies the segment as an address segment.

2. The optical disc as claimed in claim 1, wherein user data is only recorded in the data segments, and wherein when the pit is in a second position, the pit identifies the segment as a data segment.

3. The optical disc as claimed in claim 3, wherein when the pit is in a second position, the pit identifies the segment as a next-to-last segment of a sector.

4. The optical disc as claimed in claim 3 wherein when the pit is in a third position, the pit identifies the segment as a first segment of a sector.

5. An optical disc comprising a plurality of substantially concentrically extending tracks, each track including a plurality of sectors, each sector including a plurality of segments, each segment having a servo area and a data area, the servo area having servo pits that provide servo information to a disc drive, the segments including a data segment for recording user data and an address segment specifying an address of the data segment, a discrimination mark being formed in each servo area, the discrimination mark identifying a segment by a position of the mark in the servo area, a first discrimination mark formed in a first position identifying a first segment of a sector, a second discrimination mark formed in a second position identifying an address segment, and a third discrimination mark formed in a third position indicating a next-to-last segment of a sector.

6. The optical disc as claimed in claim 1, wherein said address information is recorded in said address segment in a gray code representation using a region of five clocks of a clock signal to form servo pits that represent two bits of address information.

7. An optical disc comprising a plurality of substantially concentrically extending tracks, each track including a plurality of segments having a servo area having servo pits giving a servo information to a disc drive, and a data area,
said plural segments being made up of an address segment formed at same positions in the radial direction of each track and having an address information recorded in the data area and a data segment for recording user data, said address information being recorded as pits in 4-bit gray code representation in a 11-clock area of said clock signals in said address segment, said address segment having an area corresponding to 5 clocks for representing upper two bits of the four bits in gray code representation, an area corresponding to 5 clocks for representing lower two bits of the four bits in gray code representation and an area corresponding to 1-clock therebetween, said 1-clock area having formed therein a pit when the pit representing the upper two bits in gray code representation and the pit representing the lower two pits in the gray code representation are at the shortest distance from the one-clock area and when one of the pits is at the shortest distance and the other is at the longest distance from the one-clock area.

8. The optical disc as claimed in claim 1, wherein each pit in the servo area is two clock periods long, and adjacent pits in the same track have a center-to-center spacing of not less than five pits.

9. The optical disc as claimed in claim 1, wherein scrambled and NRZI converted data are recorded in said data segment.

10. The optical disc as claimed in claim 1, wherein a magnetic pre-write area having data of a pre-set polarity recorded therein is provided at a leading end of a data area of the data segment.

11. The optical disc as claimed in claim 1, wherein a magnetic post-write area having data of a pre-set polarity recorded therein is provided at a trailing end of a data area of the data segment.

12. The optical disc of claim 1, wherein the servo area has servo pits that provide servo information to a disc drive, each track having a plurality of servo areas that are arranged so that straight radial lines intersect a servo area in each track, said optical disc being divided into a plurality of zones, each zone having a plurality of the tracks wherein a number of data clocks in a segment is equal to a number of servo clocks in the segment times a zone clock value of the segment divided by a number of servo clocks in a servo area of the segment.

13. An optical disc comprising a plurality of substantially concentrically extending tracks, each track including a plurality of segments, each segment having a servo area and a data area, the servo area having servo pits that provide servo information to a disc drive, each track having a plurality of servo areas that are arranged so that straight radial lines intersect a servo area in each track, said optical disc being divided into a plurality of zones, each zone having a plurality of tracks wherein a number of data clocks in a segment is equal to a number of servo clocks in the segment times a zone clock value of the segment divided by a number of servo clocks in a servo area of the segment, the number of servo clocks in a segment is equal to nine times the number of servo clocks in the servo area of the segment.

14. An optical disc comprising a plurality of substantially concentrically extending tracks, each track including a plurality of segments, each segment having a servo area and a data area, the servo area having servo pits that provide servo information to a disc drive, each track having a plurality of servo areas that are arranged so that straight radial lines intersect a servo area in each track, said optical disc being divided into a plurality of zones, each zone having a plurality of tracks wherein a number of data clocks in a segment is equal to a number of servo clocks in the segment times a zone clock value of the segment divided by a number of servo clocks in a servo area of the segment, wherein a next zone is started from a next segment even if there is a redundant area in a last segment of a zone and start segments of respective zones are arrayed at positions of a same radial direction.

15. The optical disc of claim 1, wherein the servo area has servo pits that provide servo information to a disc drive, each frame of a track further including a media segment, the address segment having address information recorded in a gray code representation in the data area, the media segment having media information recorded in the gray code representation in the data area.

16. The optical disc as claimed in claim 15, wherein a media segment is included in each frame in each of a plurality of consecutive tracks.

17. The optical disc as claimed in claim 16, wherein a straight radial line intersects a plurality of media segments in a corresponding plurality of tracks and wherein media information having a same content is recorded in each of the plurality of media segments.

18. The optical disc as claimed in claim 17, wherein the optical disc includes an inner rim and an outer rim, and wherein the media segments are formed in regions close to the inner rim and the outer rim.

19. The optical disc as claimed in claim 15, wherein said media information is recorded in the data areas of the media segments formed in the tracks.

20. The optical disc as claimed in claim 15, wherein the address information is recorded in said address segment as a gray code using an area corresponding to five clocks of a clock signal to form servo pits that represent two bits of address information.

21. An optical disc comprising a plurality of substantially concentrically extending tracks, each track including a plurality of segments, each segment having a servo area and a data area, the servo area having servo pits that provide servo information to a disc drive, each frame of a track including an address segment, a media segment, and a plurality of data segments, the address segment having address information recorded in a gray code representation in the data area, the media segment having media information recorded in the gray code representation in the data area, said address information is recorded as pits in 4-bit gray code representation in a 11-clock area of clock signals in said address segment, said address segment having an area corresponding to 5 clocks for representing an upper two bits of the four bits in gray code representation, an area corresponding to 5 clocks for representing a lower two bits of the four bits in gray code representation, and an area corresponding to 1-clock therebetween, the upper two bits in said four bits corresponding to 5 clocks by gray code representation and the lower two bits corresponding to 5 clocks in gray code representation, and one clock therebetween, said 1-clock area having formed therein a pit when the pit representing the upper two bits in gray code representation and the pit representing the lower two pits in the gray code representation are at a shortest distance from the one-clock area and when one of the pits is at the shortest distance and another is at a longest distance from the one-clock area.

22. The optical disc as claimed in claim 15, wherein said media information indicates whether said disc is a writable type or a replay-only type disc.

23. The optical disc as claimed in claim 15, wherein media information having a same content is recorded in a plurality of media segments.

24. The optical disc of claim 1, wherein the servo area has servo pits that provide servo information to a disc drive, each frame of a track further including a media segment, the address segment having address information recorded in a gray code representation in the data area, the media segment having media information recorded in the gray code representation in the data area, wherein the gray code representation is formed in a plurality of tracks in a vicinity of an inner rim and in a plurality of tracks in a vicinity of an outer rim.

* * * * *